(12) United States Patent
Stadler

(10) Patent No.: US 6,444,733 B1
(45) Date of Patent: Sep. 3, 2002

(54) STABILIZER COMBINATION FOR THE ROTOMOLDING PROCESS

(75) Inventor: Urs Leo Stadler, Madison, NJ (US)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 0 days.

(21) Appl. No.: 09/455,143

(22) Filed: Dec. 6, 1999

Related U.S. Application Data

(63) Continuation-in-part of application No. 09/259,724, filed on Mar. 1, 1999.

(51) Int. Cl.$^7$ .............................. C08K 5/34; C08K 5/51; B28B 1/02; B28B 1/44; D01D 5/24
(52) U.S. Cl. .................... 524/100; 524/128; 264/209.2; 264/310; 264/312
(58) Field of Search .............................. 264/209.2, 310, 264/312; 524/100, 128

(56) References Cited

U.S. PATENT DOCUMENTS

| | | | |
|---|---|---|---|
| 4,590,231 A | 5/1986 | Seltzer et al. | 524/100 |
| 4,649,221 A | 3/1987 | Ravichandran | 564/300 |
| 4,668,721 A | 5/1987 | Seltzer et al. | 524/95 |
| 4,691,015 A | 9/1987 | Behrens et al. | 544/198 |
| 4,703,073 A | 10/1987 | Winter et al. | 524/99 |
| 4,782,105 A | 11/1988 | Ravichandran et al. | 524/236 |
| 4,876,300 A | 10/1989 | Seltzer et al. | 524/100 |
| 5,013,510 A | 5/1991 | Pastor et al. | 564/301 |
| 5,149,774 A | 9/1992 | Patel et al. | 528/492 |
| 5,596,033 A | 1/1997 | Horsey et al. | 524/100 |
| 5,844,029 A | 12/1998 | Prabhu et al. | 524/236 |
| 5,880,191 A | 3/1999 | Prabhu et al. | 524/236 |
| 5,883,165 A | 3/1999 | Kröhnke et al. | 524/111 |

FOREIGN PATENT DOCUMENTS

| | | |
|---|---|---|
| CA | 1230271 | 12/1987 |
| GB | 2275473 | 8/1994 |

OTHER PUBLICATIONS

Gächter et al., Plastics Additives Handbook, 3$^{rd}$ Edition, pp. 40–71, (1990).
Encyclopedia of Polymer Science and Engineering, vol. 14, pp. 659–670.
Research Disclosure, Apr. 2000, No. 432.

Primary Examiner—Peter D. Mulcahy
(74) Attorney, Agent, or Firm—Tyler A. Stevenson

(57) ABSTRACT

A process for the production of polyolefin hollow articles comprises charging the polyolefin with a stabilizer combination comprising (a) at least one compound from the group of the organic phosphites or phosphonites, (b) one or more compounds selected from the group consisting of i.) hydroxylamine derivatives and ii.) amine oxide derivatives and (c) at least one compound from the group of the hindered amine stabilizers, filling this mixture into a mold, heating this mold in an oven to above 280° C., such that the stabilized polyolefin fuses, rotating the mold around at least 2 axes, the plastic spreading to the walls, and cooling the mold while still rotating, opening it and taking the resultant hollow article out.

10 Claims, No Drawings

STABILIZER COMBINATION FOR THE ROTOMOLDING PROCESS

This is a continuation-in-part of application Ser. No. 09/259,724, filed on Mar. 1, 1999.

The present invention relates to the production of polyolefin hollow articles by the roto-molding process, the processing stabilizer combination described hereinbelow being used.

The rotomolding or rotational molding/casting process is used for the production of fairly large plastic hollow articles which may be reinforced with glass fibres (Encyclopedia of Polymer Science and Engineering, Wiley Interscience, 1988, Vol. 14, pages 659–670). In principle, this process is carried out as follows: The plastic material is filled into one half of the mold which is then closed with the other half and heated in an oven such that the fused plastic material spreads to the walls of the mold when rotated around different axes. The hollow article is obtained after cooling. In this manner it is possible to produce, for example, storage and truck tanks from HD polyethylene. The process normally requires temperatures in the range above 300° C., sometimes even above 400° C. The requirements placed on the stabilizers are therefore different from and more stringent than those, for example, of the extrusion process where the temperatures are normally not much above 280° C.

The use of stabilizer combinations of phosphites or phosphonites with sterically hindered phenols and/or sterically hindered amines (HALS) in polyolefins is known [see, inter alia, R. Gächter, H. Müller, "Plastics Additives Handbook", Hanser Publishers, pages 40–71 (1990)].

Hydroxylamine derivatives, such as N,N,-dialkylhydroxylamines and N,N-dibenzylhydroxylamine, are well known as useful stabilizers for a variety of polymeric substrates as is taught for example in U.S. Pat. Nos. 4,590,231, 4,668,721, 4,782,105 and 4,876,300, the relevant parts of which are incorporated herein by reference.

U.S. Pat. Nos. 4,649,221, 4,691,015 and 4,703,073 teach the use of polyhydroxylamine compounds, hydroxylamines derived from hindered amines and alkylated N,N-dibenzylhydroxylamine derivatives, respectively, with one or more compounds selected from the group of phenolic antioxidants, hindered amine light stabilizers, alkylated hydroxybenzoate light stabilizers, ultraviolet light absorbers, organic phosphorus compounds, alkaline metal salts of fatty acids and thiosynergists towards stabilizing polyolefins.

U.S. Pat. No. 4,782,105 discloses the use of long chain N,N-dialkylhydroxylamines for the stabilization of poly (arylene sulfides) and unsaturated elastomers. Examples are shown where long chain N,N-dialkylhydroxylamines are used together with phosphite stabilizers in styrene/butadiene copolymer.

U.S. Pat. No. 4,876,300 discloses the use of long chain N,N-dialkylhydroxylamines as process stabilizers for polyolefin compositions. Examples are shown where long chain N,N-dialkylhydroxylamines are used together with phosphite stabilizers and also where they are used together with hindered amine stabilizers.

U.S. Pat. Nos. 4,590,231 and 4,668,721 disclose the use of N,N-dibenzylhydroxylamine or other hydroxylamine derivatives together with metal salts of fatty acids and phenolic antioxidants for the stabilization of polyolefin compositions. The compositions may also contain organic phosphorus compounds or hindered amine stabilizers.

U.S. Pat. No. 5,013,510 teaches a process for the preparation of long-chain N,N-dialkylhydroxylamines by direct oxidation. It is mentioned that the long-chain N,N-dialkylhydroxylamines are effective towards stabilizing polyolefin compositions.

U.S. Pat. No. 5,596,033 discloses the stabilization of polypropylene fiber with a binary system of select hindered amines with the N,N-dialkylhydroxylamine produced by the direct oxidation of N,N-di(hydrogenated tallow)amine.

U.S. Pat. No. 5,149,774 discloses the use of hydroxylamine derivatives towards reducing color formation during the recycling of already discolored polyolefin resins.

U.S. Pat. Nos. 5,844,029 and 5,880,191 disclose the use of saturated hydrocarbon amine oxides towards the stabilization of thermoplastic resins. It is disclosed that the thermoplastic compositions may further contain a stabilizer or mixture of stabilizers selected from phenolic antioxidants, hindered amine light stabilizers, ultraviolet light absorbers, organic phosphorus compounds, alkaline metal salts of fatty acids and thiosynergists. The co-use of amine oxides with other stabilizers towards stabilizing polyolefins is not exemplified.

It has now been found that the combination of hydroxylamine derivatives, together with organic phosphites or phosphonites and hindered amine stabilizers results in excellent stabilization in the rotomolding process. The hollow articles prepared according to the present invention exhibit excellent initial color and gas fading resistance.

Accordingly, this invention relates to a novel process for the production of polyolefin hollow articles, which comprises charging the polyolefin with a stabilizer combination, comprising
(a) at least one compound from the group of the organic phosphites and phosphonites,
(b) one or more compounds selected from the group consisting of
i.) hydroxylamine derivatives and
ii.) amine oxide derivatives and
(c) at least one compound from the group of the hindered amine stabilizers, filling this mixture into a mold, heating this mold in an oven to above 280° C., such that the stabilized polyolefin fuses, rotating the mold around at least 2 axes, the plastic material spreading to the walls, cooling the mold while still rotating, opening it, and taking the resultant hollow article out.

Of interest is a novel process wherein component (a) is at least one compound selected from the formulae (1), (2), (3), (4), (5), (6) and (7)

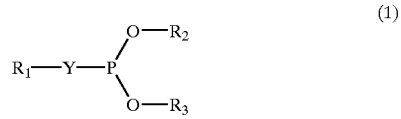

(1)

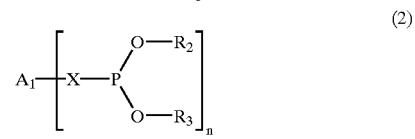

(2)

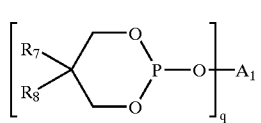
(3)

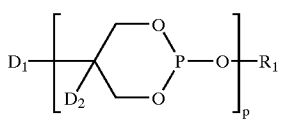
(4)

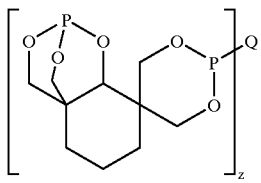
(5)

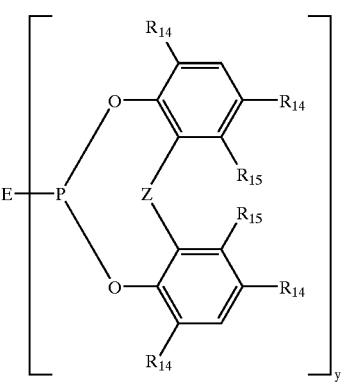
(6)

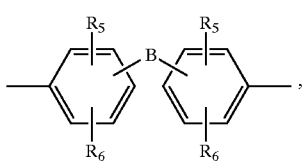
(7)

in which the indices are integral and n is 2, 3 or 4; p is 1 or 2; q is 2 or 3; r is 4 to 12; y is 1, 2 or 3; and z is 1 to 6;

$A_1$, if n is 2, is $C_2$–$C_{18}$ alkylene; $C_2$–$C_{12}$ alkylene interrupted by oxygen, sulfur or —$NR_4$—; a radical of the formula

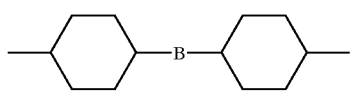

or phenylene;

$A_1$, if n is 3, is a radical of the formula —$C_rH_{2r-1}$—;

$A_1$, if n is 4, is

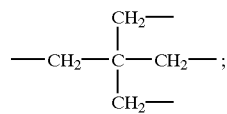

$A_2$ is as defined for $A_1$ if n is 2;

B is a direct bond, —$CH_2$—, —$CHR_4$—, —$CR_1R_4$—, sulfur, $C_5$–$C_7$ cycloalkylidene, or cyclohexylidene which is substituted by from 1 to 4 $C_1$–$C_4$ alkyl radicals in position 3, 4 and/or 5;

$D_1$, if p is 1, is $C_1$–$C_4$ alkyl and, if p is 2, is —$CH_2OCH_2$—;

$D_2$, if p is 1, is $C_1$–$C_4$ alkyl;

E, if y is 1, is $C_1$–$C_{18}$ alkyl, —$OR_1$ or halogen;

E, if y is 2, is —O—$A_2$—O—,

E, if y is 3, is a radical of the formula $R_4C(CH_2O—)_3$ or $N(CH_2CH_2O—)_3$;

Q is the radical of an at least z-valent alcohol or phenol, this radical being attached via the oxygen atom to the phosphorus atom;

$R_1$, $R_2$ and $R_3$ independently of one another are $C_1$–$C_{18}$ alkyl which is unsubstituted or substituted by halogen, —$COOR_4$, —CN or —$CONR_4R_4$; $C_2$–$C_{18}$ alkyl interrupted by oxygen, sulfur or —$NR_4$—; $C_7$–$C_9$ phenylalkyl; $C_5$–$C_{12}$ cycloalkyl, phenyl or naphthyl; naphthyl or phenyl substituted by halogen, 1 to 3 alkyl radicals or alkoxy radicals having a total of 1 to 18 carbon atoms or by $C_7$–$C_9$ phenylalkyl; or a radical of the formula in which m is an integer from the range 3 to 6;

$R_4$ is hydrogen, $C_1$–$C_{18}$ alkyl, $C_5$–$C_{12}$ cycloalkyl or $C_7$–$C_9$ phenylalkyl, $R_5$ and $R_6$ independently of one another are hydrogen, $C_1$–$C_8$ alkyl or $C_5$–$C_6$ cycloalkyl, $R_7$ and $R_8$, if q is 2, independently of one another are $C_1$–$C_4$ alkyl or together are a 2,3-dehydropentamethylene radical; and $R_7$ and $R_8$, if q is 3, are methyl;

$R_{14}$ is hydrogen, $C_1$–$C_9$ alkyl or cyclohexyl, $R_{15}$ is hydrogen or methyl and, if two or more radicals $R_{14}$ and $R_{15}$ are present, these radicals are identical or different, X and Y are each a direct bond or oxygen, Z is a direct bond, methylene, —$C(R_{16})_2$— or sulfur, and $R_{16}$ is $C_1$–$C_8$ alkyl.

Of particular interest is a novel process wherein component (a) is at least one compound selected from the formulae (1), (2), (5) and (6), in which n is the number 2, and y is the number 1, 2 or 3;

$A_1$ is $C_2$–$C_{18}$ alkylene, p-phenylene or p-biphenylene,

E, if y is 1, is $C_1$–$C_{18}$ alkyl, —$OR_1$ or fluorine;

E, if y is 2, is p-biphenylene,

E, if y is 3, is $N(CH_2CH_2O—)_3$, $R_1$, $R_2$ and $R_3$ independently of one another are $C_1$–$C_{18}$ alkyl, $C_7$–$C_9$ phenylalkyl, cyclohexyl, phenyl, or phenyl substituted by 1 to 3 alkyl radicals having a total of 1 to 18 carbon atoms;

$R_{14}$ is hydrogen or $C_1$–$C_9$ alkyl, $R_{15}$ is hydrogen or methyl;

X is a direct bond,

Y is oxygen,

Z is a direct bond or —$CH(R_{16})$—, and $R_{16}$ is $C_1$–$C_4$ alkyl.

Likewise of interest is a novel process wherein component (a) is at least one compound selected from the formulae (1), (2), (5) and (6), in which n is the number 2 and y is the number 1 or 3;

$A_1$ is p-biphenylene,

E, if y is 1, is $C_1$–$C_{18}$alkoxy or fluorine,

E, if y is 3, is $N(CH_2CH_2O—)_3$, $R_1$, $R_2$ and $R_3$ independently of one another are $C_1$–$C_8$ alkyl, or phenyl substituted by 2 or 3 alkyl radicals having a total of 2 to 12 carbon atoms;

$R_{14}$ is methyl or tert-butyl;

$R_{15}$ is hydrogen;

X is a direct bond;

Y is oxygen; and

Z is a direct bond, methylene or —$CH(CH_3)$—.

Particular preference is given to a process wherein component (a) is at least one compound selected from the formulae (1), (2) and (6).

Special preference is given to a process wherein component (a) is at least one compound of the formula (I)

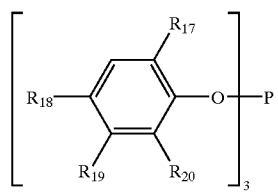

(I)

in which $R_{17}$ and $R_{18}$ independently of one another are hydrogen, $C_1$–$C_8$ alkyl, cyclohexyl or phenyl, and $R_{19}$ and $R_{20}$ independently of one another are hydrogen or $C_1$–$C_4$ alkyl.

The following compounds are examples of organic phosphites and phosphonites which are particularly suitable for use in component (a) in the novel process:

Triphenyl phosphite, diphenyl alkyl phosphites, phenyl dialkyl phosphites, tris(nonylphenyl)phosphite, trilauryl phosphite, trioctadecyl phosphite, distearyl pentaerythritol diphosphite, tris(2,4-di-tert-butylphenyl)phosphite (Irgafos® 168, Ciba Specialty Chemicals Corp.), diisodecyl pentaerythritol diphosphite, bis(2,4-di-tert-butylphenyl) pentaerythritol diphosphite (formula (D)), bis(2,6-di-tert-butyl-4-methylphenyl)pentaerythritol diphosphite (formula (E)), bisisodecyloxypentaerythritol diphosphite, bis(2,4-di-tert-butyl-6-methylphenyl)pentaerythritol diphosphite, bis (2,4,6-tri-tert-butylphenyl)pentaerythritol diphosphite, tristearyl sorbitol triphosphite, tetrakis-(2,4-di-tert-butylphenyl)4,4'-biphenylene-diphosphonite (Irgafos® P-EPQ, Ciba Specialty Chemicals Corp., formula (H)), 6-isooctyloxy-2,4,8,10-tetra-tert-butyldibenzo[d,f][1,3,2] dioxaphosphepin (formula (C)), 6-fluoro-2,4,8,10-tetra-tert-butyl-12-methyldibenzo[d,g][1,3,2]dioxaphosphocin (formula (A)), bis(2,4-di-tert-butyl-6-methylphenyl)methyl phosphite, bis(2,4-di-tert-butyl-6-methylphenyl)ethyl phosphite (formula (G)).

With particular preference the following phosphites and phosphonites are used in component (a) in the novel process:

Tris(2,4-di-tert-butylphenyl)phosphite (Irgafos® 168, Ciba Specialty Chemicals Corp.), tris(nonylphenyl) phosphite,

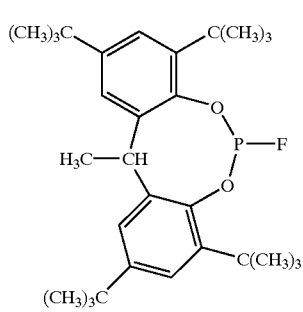

(A)

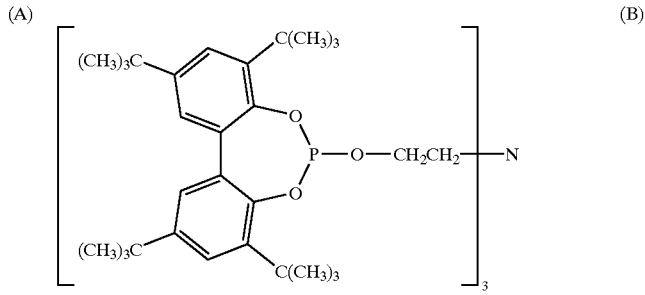

(B)

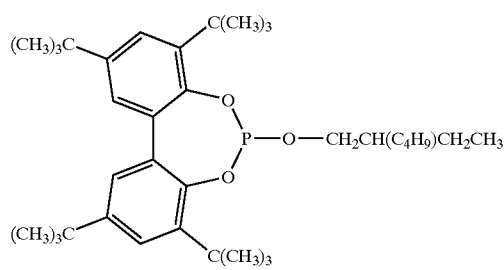
(C)
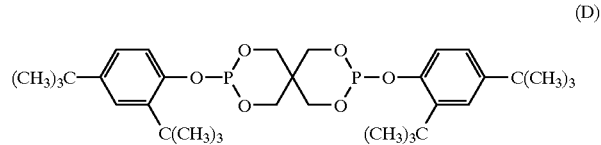
(D)
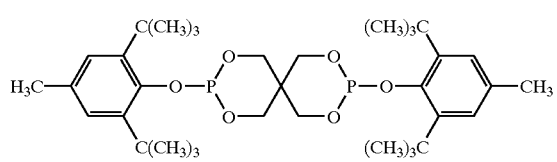
(E)
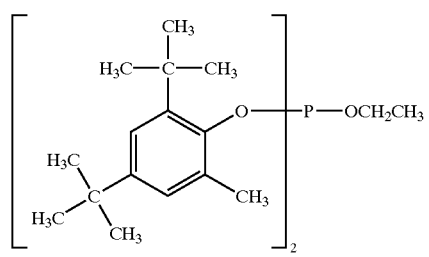
(G)
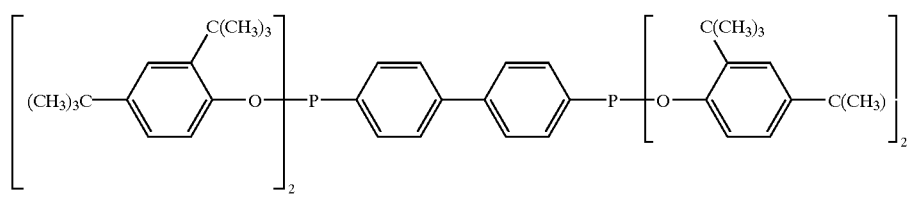
(H)
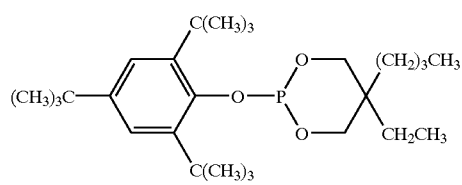
(J)
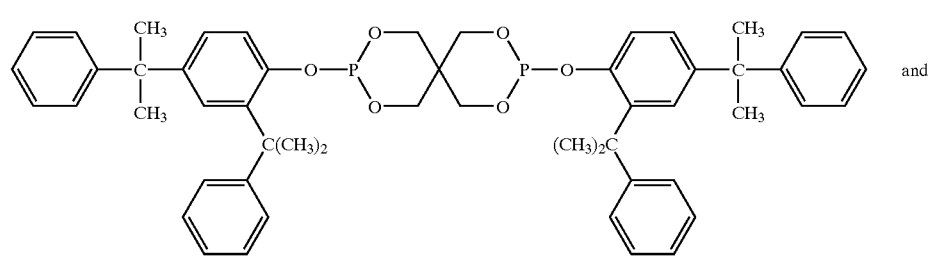
(K)
and
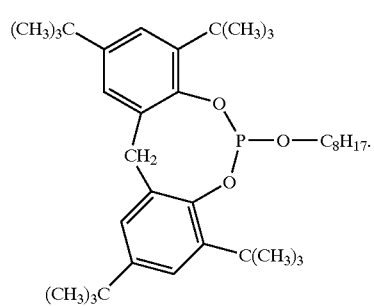
(L)

Very particular preference is given to the use of the following compounds in component (a) in the novel process: Tris(2,4-di-tert-butylphenyl)phosphite (Irgafos® 168, Ciba Specialty Chemicals Corp.), bis(2,4-di-tert-butyl-6-methylphenyl)ethyl phosphite (Irgafos® 38, Ciba Specialty Chemicals Corp., formula (G)), bis(2,4-di-tert-butylphenyl) pentaerythritol diphosphite (Ultranox® 626, GE Chemicals, formula (D)), tetrakis(2,4-di-tert-butylphenyl)4,4'-biphenylenediphosphonite (Irgafos® P-EPQ, Ciba Specialty Chemicals Corp., formula (H)), 2,2',2"-nitrilo[triethyltris(3, 3'5,5'-tetra-tert-butyl-1,1'-biphenyl-2,2'-diyl)phosphite] (Irgafos® 12, Ciba Specialty Chemicals Corp., formula (B)). Ultranox® 641 (GE Chemicals, formula (J)), Doverphos® S9228 (Dover Chemicals, formula (K)) or Mark® HP10 (Adeka Argus, formula (L)).

These organic phosphites and phosphonites are known compounds; many of them are commercially available.

The organic phosphites or phosphonites of component (a) are preferably used in amounts of about 0.01% to about 10%, in particular from about 0.05% to about 5%, typically from about 0.1% to about 3% by weight, based on the weight of the polyolefin hollow article to be stabilized.

The hydroxylamine derivatives of component i.) employed in the novel process are of the formula (II)

(II)

wherein $T_1$ is straight or branched chain alkyl of 1 to 36 carbon atoms, cycloalkyl of 5 to 12 carbon atoms, aralkyl of 7 to 9 carbon atoms, or said aralkyl substituted by one or two alkyl of 1 to 12 carbon atoms or by one or two halogen atoms;

$T_2$ is hydrogen, or independently has the same meaning as $T_1$.

Preferance is given to a process wherein the compounds of component i.) are N,N-dihydrocarbylhydroxylamines of formula (II) wherein $T_1$ and $T_2$ are independently benzyl, ethyl, octyl, lauryl, dodecyl, tetradecyl, hexadecyl, heptadecyl or octadecyl, or wherein $T_1$ and $T_2$ are each the alkyl mixture found in hydrogenated tallow amine.

Specialpreferance is given to a process wherein the compounds of component i.) are N,N-dihydrocarbylhydroxylamines selected from the group consisting of N,N-dibenzylhydroxylamine, N,N-diethylhydroxylamine, N,N-dioctylhydroxylamine, N,N-dilaurylhydroxylamine, N,N-didodecylhydroxylamine, N,N-ditetradecylhydroxylaamine, N,N-dihexadecylhydroxylamine, N,N-dioctadecylhydroxylamine, N-hexadecyl-N-tetradecylhydroxylamine, N-hexadecyl-N-heptadecylhydroxylamine, N-hexadecyl-N-octadecylhydroxylamine, N-heptadecyl-N-octadecylhydroxylamine, and N,N-di(hydrogenated tallow) hydroxylamine.

Particular preference is given to a process wherein component i.) is an N,N-di(alkyl)hydroxylamine produced by the direct oxidation of N,N-di(hydrogenated tallow)amine (Irgastab® 042, Ciba Specialty Chemicals Corp.).

The amine oxide derivatives of component ii.) are saturated tertiary amine oxides as represented by general formula (III):

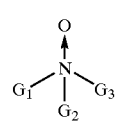

(III)

wherein $G_1$ and $G_2$ are independently a straight or branched chain alkyl of 6 to 36 carbon atoms, aryl of 6 to 12 carbon atoms, aralkyl of 7 to 36 carbon atoms, alkaryl of 7 to 36 carbon atoms, cycloalkyl of 5 to 36 carbon atoms, alkcycloalkyl of 6 to 36 carbon atoms or cycloalkylalkyl of 6 to 36 carbon atoms;

$G_3$ is a straight or branched chain alkyl of 1 to 36 carbon atoms, aryl of 6 to 12 carbon atoms, aralkyl of 7 to 36 carbon atoms, alkaryl of 7 to 36 carbon atoms, cycloalkyl of 5 to 36 carbon atoms, alkcycloalkyl of 6 to 36 carbon atoms or cycloalkylalkyl of 6 to 36 carbon atoms; with the proviso that at least one of $G_1$, $G_2$ and $G_3$ contains a β carbon-hydrogen bond; and wherein said alkyl, aralkyl, alkaryl, cycloalkyl, alkcycloalkyl and cycloalkylalkyl groups may be interuppted by one to sixteen —O—, —S—, —SO—, —SO$_2$—, —COO—, —OCO—, —CO—, —NG$_4$—, —CONG$_4$— and —NG$_4$CO— groups, or wherein said alkyl, aralkyl, alkaryl, cycloalkyl, alkcycloalkyl and cycloalkylallyl groups may be substituted by one to sixteen groups selected from —OG$_4$, —SG$_4$, —COOG$_4$, —OCOG$_4$, —COG$_4$, —N(G$_4$)$_2$, —CON (G$_4$)$_2$, —NG$_4$COG$_4$ and 5- and 6-membered rings containing the —C(CH$_3$)(CH$_2$R$_x$)NL(CH$_2$R$_x$)(CH$_3$) C— group or wherein said alkyl, aralkyl, alkaryl, cycloalkyl, alkcycloalkyl and cycloalkylalkyl groups are both interuppted and substituted by the groups mentioned above; and wherein $G_4$ is independently hydrogen or alkyl of 1 to 8 carbon atoms;

$R_x$ is hydrogen or methyl, preferably hydrogen;

L is a $C_{1-30}$ straight or branched chain alkyl moiety, a —C(O)R moiety wherein R is a $C_{1-30}$ straight or branched chain alkyl group, or a —OR moiety wherein R is a $C_{1-30}$ straight or branched chain alkyl group; and wherein said aryl groups may be substituted by one to three halogen, alkyl of 1 to 8 carbon atoms, alkoxy of 1 to 8 carbon atoms or combinations thereof.

A preferred structure of formula (III) is where $G_1$ and $G_2$ are indpendently benzyl or substituted benzyl. It is also possible for each of $G_1$, $G_2$, and $G_3$ to be the same residue. $G_1$ and $G_2$ are also preferably alkyl groups of 8 to 26 carbon atoms and most preferably alkyl groups of 10 to 26 carbon atoms and $G_3$ is preferably an alkyl group of 1 to 22 carbon atoms and most preferably methyl or substituted methyl. Also, preferred amine oxides include those wherein $G_1$, $G_2$, and $G_3$ are the same alkyl groups of 6 to 36 carbon atoms. Preferably, all of the aforementioned residues for $G_1$, $G_2$, and $G_3$ are saturated hydrocarbon residues or saturated hydrocarbon residues containing at least one of the aforementioned —O—, —S—, —SO—, —CO$_2$—, —CO—, or —CON— moieties. Those skilled in the art will be able to envision other useful residues for each of $G_1$, $G_2$, and $G_3$ without detracting from the present invention.

The saturated amine oxides of component ii.) may also includes poly(amine oxides). By poly(amine oxide) is meant tertiary amine oxides containing at least two tertiary amine oxides per molecule. Illustrative poly(amine oxides), also called "poly(tertiary amine oxides)", include the tertiary amine oxide analogues of aliphatic and alicyclic diamines such as, for example, 1,4-diaminobutane; 1,6-diaminohexane; 1,10-diaminodecane; and 1,4-diaminocyclohexane, and aromatic based diamines such as, for example, diamino anthraquinones and diaminoanisoles.

Also included as component ii.) are tertiary amine oxides derived from oligomers and polymers of the aforementioned diamines. Useful amine oxides also include amine oxides attached to polymers, for example, polyolefins, polyacrylates, polyesters, polyamides, polystyrenes, and the like. When the amine oxide is attached to a polymer, the average number of amine oxides per polymer can vary widely as not all polymer chains need to contain an amine oxide. All of the aforementioned amine oxides may optionally contain at least one —O—, —S—, —SO—, —CO$_2$—, —CO—, or —CONG$_4$— moiety. In a preferred embodiment, each tertiary amine oxide of the polymeric tertiary amine oxide contains a C$_1$ residue.

The groups G$_1$, G$_2$ and G$_3$ of formula (III) may be attached to a molecule containing a hindered amine. Hindered amines are known in the art and the amine oxide of the present invention may be attached to the hindered amine in any manner and structural position of the hindered amine. Useful hindered amines when part of a compound of component ii.) include those of the general formulas (IV) and (V):

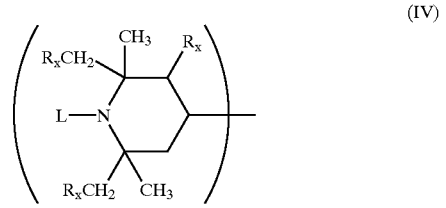

(IV)

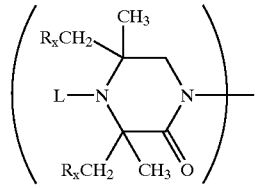

(V)

wherein L and R$_x$ are as described above. Also included are amine oxides containing more than one hindered amine and more than one saturated amine oxide per molecule. The hindered amine may be attached to a poly(tertiary amine oxide) or attached to a polymeric substrate, as discussed above.

The compounds of component (b) are preferably used in amounts, in total, of about 0.0005% to about 5%, in particular from about 0.001% to about 2%, typically from about 0.01% to about 2% by weight, based on the weight of the polyolefin hollow article to be stabilized.

Component (c) employed in the novel process is at least one compound that contains at least one group of the formula (VI)

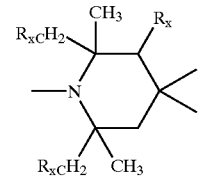

(VI)

in which R$_x$ is hydrogen or methyl. Preferably R$_x$ is hydrogen. Preferably, compounds of component (c) are of high molecular weight and may be discrete compounds or oligomeric mixtures.

Particularly preferred hindered amines of component (c) are:

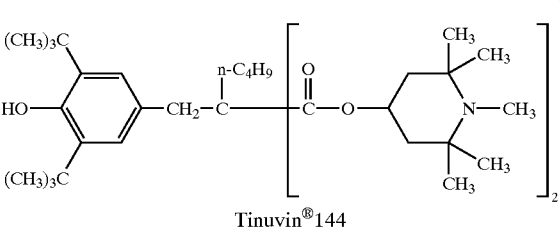

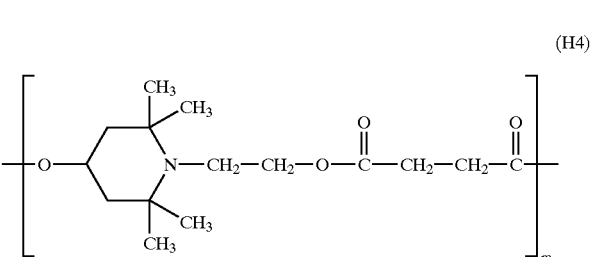

-continued
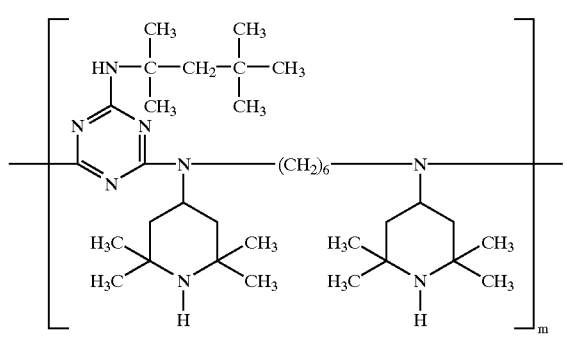
Chimassorb®944 (H5)
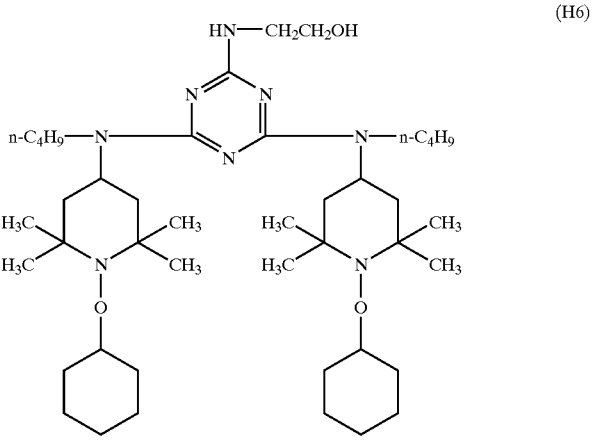
(H6)
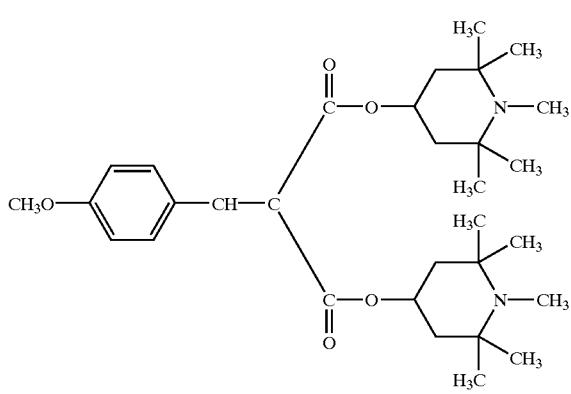
Sanduvor®PR-31 (H7)
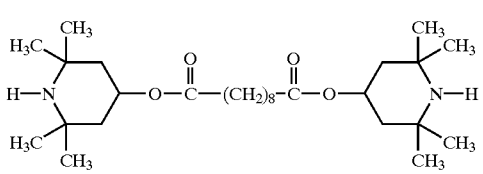
Tinuvin®770 (H8)
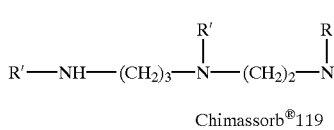
Chimassorb®119
R'—NH—(CH$_2$)$_3$—N(R')—(CH$_2$)$_2$—N(R')—(CH$_2$)$_3$—NH—R'   where R' is
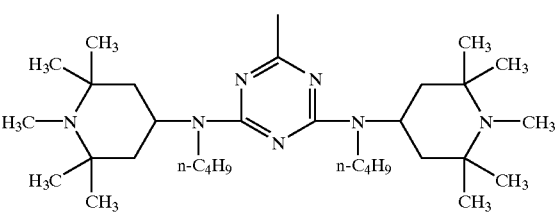
(H9)
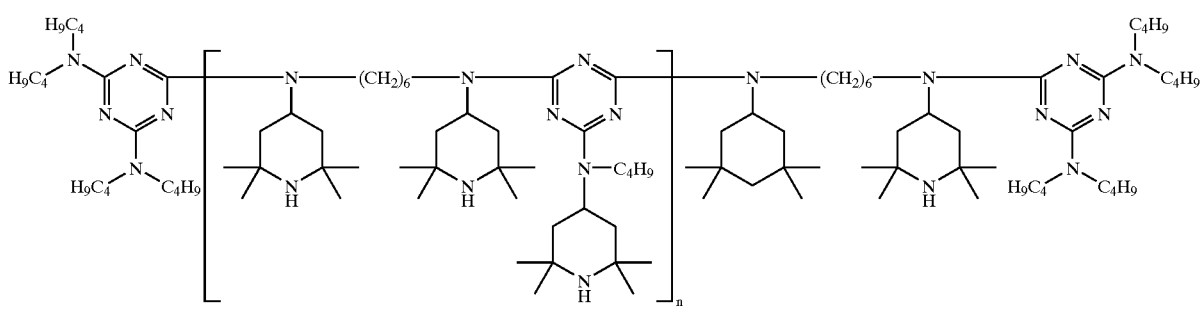
Chimassorb®2020 (H10)

-continued
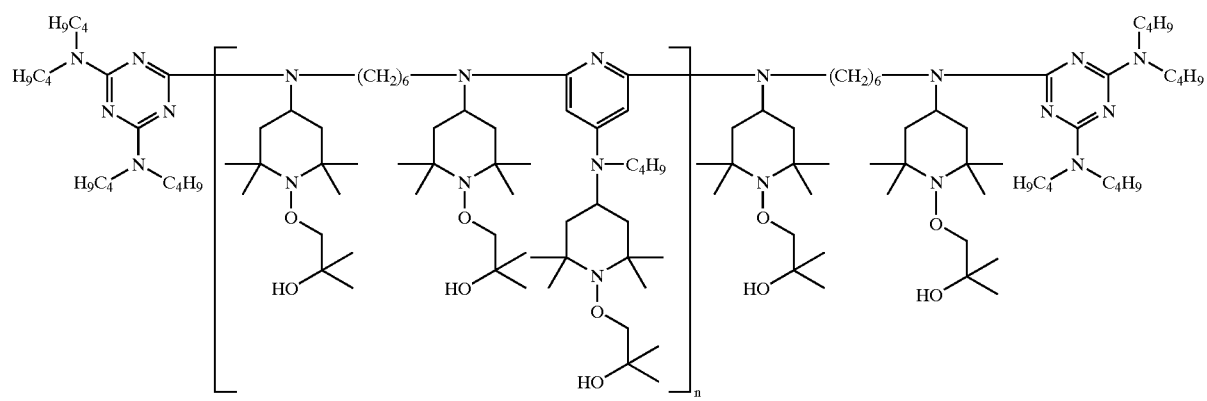
(H11)
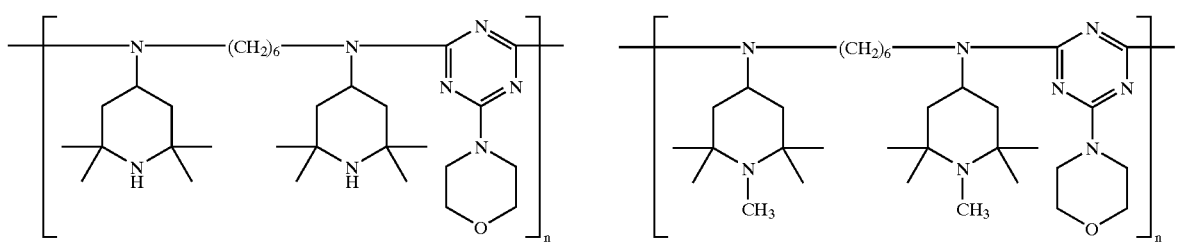
(H12) Cyasorb®UV-3346
(H13) Cyasorb®UV-3529
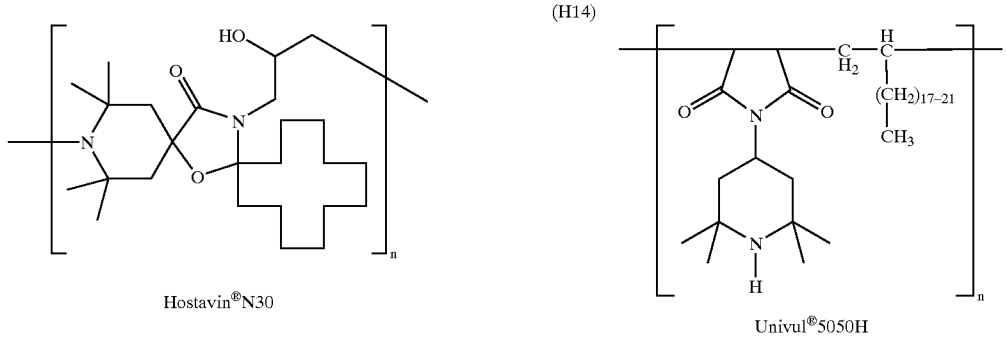
(H14) Hostavin®N30
(H15) Univul®5050H
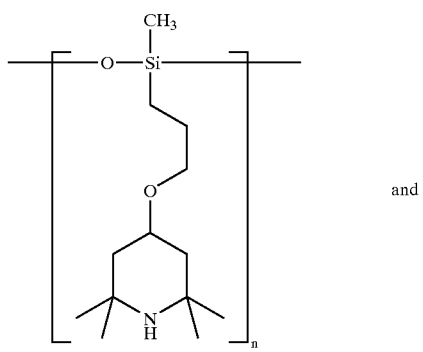
and
(H16) Uvasil®299

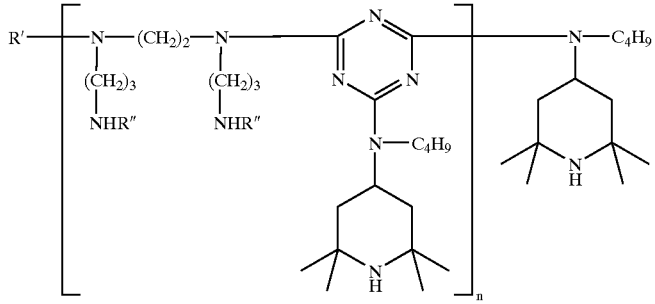

where R' = R" or H

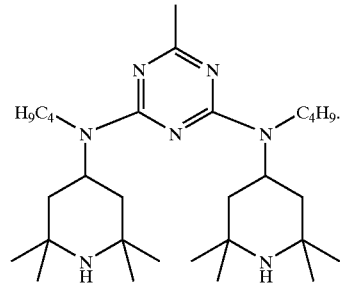

and where R" =

Uvasorb®HA88

The compounds of the sterically hindered amine type, are known and some are commercially available.

Tinuvin® and Chimassorb® are protected trade names of Ciba Specialty Chemicals Corp. Sanduvor® and Hostavin® are protected trade names of Clariant. Cyasorb® is a protected trade name of Cytec Corporation. Uvinul® is a protected trade name of BASF. Uvasil® is a protected trade name of Enichem. Uvasorb® is a protected trade name of 3V Sigma.

The hindered amines of component (c) are preferably used in amounts of about 0.01% to about 10%, in particular from about 0.05% to about 5%, typically from about 0.1% to about 3% by weight, based on the weight of the polyolefin hollow article to be stabilized.

The stabilizer combination comprising components (a), (b) and (c) is suitable for stabilizing polyolefin hollow articles which are prepared by the rotomolding process.

Examples for polyolefins are:

1. Polymers of monoolefins and diolefins, for example polypropylene, polyisobutylene, polybut-1-ene, poly-4-methylpent-1-ene, polyisoprene or polybutadiene, as well as polymers of cycloolefins, for instance of cyclopentene or norbornene, polyethylene (which optionally can be crosslinked), for example high density polyethylene (HDPE), high density and high molecular weight polyethylene (HDPE-HMW), high density and ultrahigh molecular weight polyethylene (HDPE-UHMW), medium density polyethylene (MDPE), low density polyethylene (LDPE), linear low density polyethylene (LLDPE), (VLDPE) and (ULDPE).

Polyolefins, i.e. the polymers of monoolefins exemplified in the preceding paragraph, preferably polyethylene and polypropylene, can be prepared by different, and especially by the following, methods:

i) radical polymerisation (normally under high pressure and at elevated temperature).

ii) catalytic polymerisation using a catalyst that normally contains one or more than one metal of groups IVb, Vb, VIb or VIII of the Periodic Table. These metals usually have one or more than one ligand, typically oxides, halides, alcoholates, esters, ethers, amines, alkyls, alkenyls and/or aryls that may be either p- or s-coordinated. These metal complexes may be in the free form or fixed on substrates, typically on activated magnesium chloride, titanium(III) chloride, alumina or silicon oxide. These catalysts may be soluble or insoluble in the polymerisation medium. The catalysts can be used by themselves in the polymerisation or further activators may be used, typically metal alkyls, metal hydrides, metal alkyl halides, metal alkyl oxides or metal alkyloxanes, said metals being elements of groups Ia, IIa and/or IIIa of the Periodic Table. The activators may be modified conveniently with further ester, ether, amine or silyl ether groups. These catalyst systems are usually termed Phillips, Standard Oil Indiana, Ziegler (-Natta), TNZ (DuPont), metallocene or single site catalysts (SSC).

2. Mixtures of the polymers mentioned under 1.), for example mixtures of polypropylene with polyisobutylene, polypropylene with polyethylene (for example PP/HDPE, PP/LDPE) and mixtures of different types of polyethylene (for example LDPE/HDPE).

3. Copolymers of monoolefins and diolefins with each other or with other vinyl monomers, for example ethylene/propylene copolymers, linear low density polyethylene (LLDPE) and mixtures thereof with low density polyethylene (LDPE), propylene/but-1-ene copolymers, propylene/isobutylene copolymers, ethylene/but-1-ene copolymers, ethylene/hexene copolymers, ethylene/methylpentene copolymers, ethylene/heptene copolymers, ethylene/octene copolymers, propylene/butadiene copolymers, isobutylene/isoprene copolymers, ethylene/alkyl acrylate copolymers, ethylene/alkyl methacrylate copolymers, ethylene/vinyl acetate copolymers and their copolymers with carbon monoxide or ethylene/acrylic acid copolymers and their salts (ionomers) as well as terpolymers of ethylene with propylene and a diene such as hexadiene, dicyclopentadiene or ethylidene-norbornene; and mixtures of such copolymers with one another and with polymers mentioned in 1) above, for example polypropylene/ethylene-propylene copolymers, LDPE/ethylene-vinyl acetate copolymers (EVA), LDPE/ethylene-acrylic acid copolymers (EAA), LLDPE/EVA, LLDPE/EAA and alternating or random polyalkylene/carbon monoxide copolymers and mixtures thereof with other polymers, for example polyamides.

Preferred polyolefins are polyethylene or polypropylene and their copolymers with mono- and diolefins.

In addition to components (a), (b) and (c) the novel process may comprise further costabilizers (additives) such as, for example, the following:

1. Antioxidants 1.1. Alkylated monophenols, for example 2,6-di-tert-butyl-4-methylphenol, 2-tert-butyl-4,6-dimethylphenol, 2,6-di-tert-butyl-4-ethylphenol, 2,6-di-tert-butyl-4-n- butylphenol, 2,6-di-tert-butyl-4-isobutylphenol, 2,6-dicyclopentyl-4-methylphenol, 2-(α-methylcyclohexyl)-4,6-dimethylphenol, 2,6-ioctadecyl-4-methylphenol, 2,4,6-tricyclohexylphenol, 2,6-di-tert-butyl-4-methoxymethylphenol, nonylphenols which are linear or branched in the side chains, for example, 2,6-di-nonyl-4-methylphenol, 2,4-dimethyl-6-(1'-methylundec-1'-yl) phenol, 2,4-dimethyl-6-(1'-methylheptadec-1'-yl)phenol, 2,4-dimethyl-6-(1'-methyltridec-1'-yl)phenol and mixtures thereof.

1.2. Alkylthiomethylphenols, for example 2,4-dioctylthiomethyl-6-tert-butylphenol, 2,4-dioctylthiomethyl-6-methylphenol, 2,4-dioctylthiomethyl-6-ethylphenol, 2,6-di-dodecylthiomethyl-4-nonylphenol.

1.3. Hydroquinones and alkylated hydroquinones, for example 2,6-di-tert-butyl-4-methoxyphenol, 2,5-di-tert-butylhydroquinone, 2,5-di-tert-amylhydroquinone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, bis-(3,5-di-tert-butyl-4-hydroxyphenyl)adipate.

1.4. Tocopherols, for example α-tocopherol, β-tocopherol, γ-tocopherol, δ-tocopherol and mixtures thereof (Vitamin E).

1.5. Hydroxylated thiodiphenyl ethers, for example 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis-(3,6-di-sec-amylphenol), 4,4'-bis(2,6-dimethyl-4-hydroxyphenyl)disulfide.

1.6. Alkylidenebisphenols, for example 2,2'-methylenebis(6-tert-butyl-4-methylphenol), 2,2'-methylenebis(6-tert-butyl-4-ethylphenol), 2,2'-methylenebis[4-methyl-6-(α-methylcyclohexyl)phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis[6-(α-methylbenzyl)-4-nonylphenol], 2,2'-methylenebis[6-(α,α-dimethylbenzyl)-4nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methyl-phenyl)-3-n-dodecylmercaptobutane, ethylene glycol bis[3,3-bis(3'-tert-butyl-4'-hydroxyphenyl) butyrate], bis(3-tert-butyl-4-hydroxy-5-methyl-phenyl) dicyclopentadiene, bis[2-(3'-tert-butyl-2'-hydroxy-5'-methylbenzyl)-6-tert-butyl-4-methylphenyl]terephthalate, 1,1-bis-(3,5-dimethyl-2-hydroxyphenyl)butane, 2,2-bis-(3,5-di-tert-butyl-4-hydroxyphenyl)propane, 2,2-bis-(5-tert-butyl-4-hydroxy2-methylphenyl)-4-n-dodecylmercaptobutane, 1,1,5,5-tetra-(5-tert-butyl-4-hydroxy-2-methylphenyl)pentane.

1.7. O-, N- and S-benzyl compounds, for example 3,5,3',5'-tetra-tert-butyl-4,4'-dihydroxydibenzyl ether, octadecyl-4-hydroxy-3,5-dimethylbenzylmercaptoacetate, tridecyl-4-hydroxy-3,5-di-tert-butylbenzylmercaptoacetate, tris(3,5-di-tert-butyl-4-hydroxybenzyl)amine, bis(4-tert-butyl-3-hydroxy-2,6-dimethylbenzyl)dithioterephthalate, bis(3,5-di-tert-butyl-4-hydroxybenzyl)sulfide, isooctyl-3,5-di-tert-butyl-4-hydroxybenzylmercaptoacetate.

1.8. Hydroxybenzylated malonates, for example dioctadecyl-2,2-bis-(3,5-di-tert-butyl-2-hydroxybenzyl) malonate, di-octadecyl-2-(3-tert-butyl-4-hydroxy-5-methylbenzyl)malonate, di-dodecylmercaptoethyl-2,2-bis-(3,5-di-tert-butyl-4-hydroxybenzyl)malonate, bis[4-(1,1,3,3-tetramethylbutyl)phenyl]-2,2-bis(3,5-di-tert-butyl-4-hydroxybenzyl)malonate.

1.9. Aromatic hydroxybenzyl compounds, for example 1,3,5-tris-(3,5-di-tert-butyl-4-hydroxybenzyl)-2,4,6-trimethylbenzene, 1,4-bis(3,5-di-tert-butyl-4-hydroxybenzyl)-2,3,5,6-tetramethylbenzene, 2,4,6-tris(3,5-di-tert-butyl-4-hydroxybenzyl)phenol.

1.10. Triazine Compounds, for example 2,4-bis (octylmercapto)-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris (3,5-di-tert-butyl-4-hydroxyphenoxy)-1,2,3-triazine, 1,3,5-tris-(3,5-di-tert-butyl-4-hydroxybenzyl)isocyanurate, 1,3,5-tris(4-tert-butyl-3-hydroxy-2,6-dimethylbenzyl) isocyanurate, 2,4,6-tris(3,5-di-tert-butyl-4-hydroxyphenylethyl)-1,3,5-triazine, 1,3,5-tris(3,5-di-tert-butyl-4-hydroxyphenylpropionyl)-hexahydro-1,3,5-triazine, 1,3,5-tris(3,5-dicyclohexyl-4-hydroxybenzyl)isocyanurate.

1.11. Benzylphosphonates, for example dimethyl-2,5-di-tert-butyl-4-hydroxybenzylphosphonate, diethyl-3,5-di-tert-butyl-4-hydroxybenzylphosphonate, dioctadecyl3,5-di-tert-butyl-4-hydroxybenzylphosphonate, dioctadecyl-5-tert-butyl-4-hydroxy-3-methylbenzylphosphonate, the calcium salt of the monoethyl ester of 3,5-di-tert-butyl-4-hydroxybenzylphosphonic acid.

1.12. Acylaminophenols, for example 4-hydroxylauranilide, 4-hydroxystearanilide, octyl N-(3,5-di-tert-butyl-4-hydroxyphenyl)carbamate.

1.13. Esters of β-(3,5-di-tert-butyl-4-hydroxyphenyl) propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris (hydroxyethyl)isocyanurate, N,N'-bis(hydroxyethyl) oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.14. Esters of β-(5-tert-butyl-4-hydroxy-3-methylphenyl)propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl) oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.15. Esters of β-(3,5-dicyclohexyl-4-hydroxyphenyl) propionic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.16. Esters of 3,5-di-tert-butyl-4-hydroxyphenyl acetic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.17. Amides of β-(3,5-di-tert-butyl-4-hydroxyphenyl) propionic acid e.g. N,N'-bis(3,5-di-tert-butyl-4-hydroxyphenylpropionyl)hexamethylenediamide, N,N'-bis(3,5-di-tert-butyl-4-hydroxyphenylpropionyl)trimethylenediamide, N,N'-bis(3,5-di-tert-butyl-4-hydroxyphenylpropionyl)hydrazide, N,N'-bis[2-(3-[3,5-di-tert-butyl-4-hydroxyphenyl]propionyloxy)ethyl]oxamide (Naugard® XL-1 supplied by Uniroyal).

1.18. Ascorbic acid (vitamin C)

1.19. Aminic antioxidants, for example N,N'-di-isopropyl-p-phenylenediamine, N,N'-di-sec-butyl-p-phenylenediamine, N,N'-bis(1,4-dimethylpentyl)-p-phenylenediamine, N,N'-bis(1-ethyl-3-methylpentyl)-p-phenylenediamine, N,N'-bis(1-methylheptyl)-p-phenylenediamine, N,N'-dicyclohexyl-p-phenylenediamine, N,N'-diphenyl-p-phenylenediamine, N,N'-bis(2-naphthyl)-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, N-cyclohexyl-N'-phenyl-p-phenlenediamine, 4-(p-toluenesulfamoyl)diphenylamine, N,N'-dimethyl-N,N'-di-sec-butyl-p-phenylenediamine, diphenylamine, N-allyldiphenylamine, 4-isopropoxydiphenylamine, N-phenyl-1-naphthylamine, N-(4-tert-octylphenyl)-1-naphthylamine, N-phenyl-2-naphthylamine, octylated diphenylamine, for example p,p'-di-tert-octyldiphenylamine, 4-n-butylaminophenol, 4-butyrylaminophenol, 4-nonanoylaminophenol, 4-dodecanoylaminophenol, 4-octadecanoylaminophenol, bis(4-methoxyphenyl)amine, 2,6-di-tert-butyl-4-dimethylaminomethylphenol, 2,4'-diaminodiphenylmethane, 4,4'-diaminodiphenylmethane, N,N,N',N'-tetramethyl-4,4'-diaminodiphenylmethane, 1,2-bis[(2-methylphenyl)amino]ethane, 1,2-bis(phenylamino)propane, (o-tolyl)biguanide, bis[4-(1',3'-dimethylbutyl)phenyl]amine, tert-octylated N-phenyl-1-naphthylamine, a mixture of mono- and dialkylated tert-butyl/tert-octyldiphenylamines, a mixture of mono- and dialkylated nonyldiphenylamines, a mixture of mono- and dialkylated dodecyldiphenylamines, a mixture of mono- and dialkylated isopropyl/isohexyldiphenylamines, a mixture of mono- and dialkylated tert-butyldiphenylamines, 2,3-dihydro-3,3-dimethyl-4H-1,4-benzothiazine, phenothiazine, a mixture of mono- and dialkylated tert-butyl/tert-octylphenothiazines, a mixture of mono- and dialkylated tert-octylphenothiazines, N-allylphenothiazin, N,N,N',N'-tetraphenyl-1,4-diaminobut-2-ene, N,N-bis(2,2,6,6-tetramethyl-piperid-4-yl-hexamethylenediamine, bis(2,2,6,6-tetramethylpiperid4-yl)sebacate, 2,2,6,6-tetramethylpiperidin-4-one, 2,2,6,6-tetramethylpiperidin-4-ol.

2. UV absorbers and light stabilizers 2.1. 2-(2'-Hydroxyphenyl)benzotriazoles, for example 2-(2'-hydroxy-5'-methylphenyl)benzotriazole, 2-(3',5'-di-tert-butyl-2'-hydroxyphenyl)benzotriazole, 2-(5'-tert-butyl-2'-hydroxyphenyl)benzotriazole, 2-(2'-hydroxy-5'-(1,1,3,3-tetramethylbutyl)phenyl)benzotriazole, 2-(3',5'-di-tert-butyl-2'-hydroxyphenyl)-5-chloro-benzotriazole, 2-(3'-tert-butyl-2'-hydroxy-5'-methylphenyl)-5-chloro-benzotriazole, 2-(3'-sec-butyl-5'-tert-butyl-2'-hydroxyphenyl)benzotriazole, 2-(2'-hydroxy-4'-octyloxyphenyl)benzotriazole, 2-(3',5'-di-tert-amyl-2'-hydroxyphenyl)benzotriazole, 2-(3',5'-bis-(α,α-dimethylbenzyl)-2'-hydroxyphenyl)benzotriazole, 2-(3'-tert-butyl-2'-hydroxy-5'-(2-octyloxycarbonylethyl)phenyl)-5-chloro-benzotriazole, 2-(3'-tert-butyl-5'-[2-(2-ethylhexyloxy)-carbonylethyl]-2'-hydroxyphenyl)-5-chloro-benzotriazole, 2-(3'-tert-butyl-2'-hydroxy-5'-(2-methoxycarbonylethyl)phenyl)-5'-chlorobenzotriazole, 2-(3'-terty-butyl-2'-hydroxy-5'-(2-methoxycarbonylethyl)phenyl)benzotriazole, 2-(3'-tert-butyl-2'-hydroxy-5'-(2-octyloxycarbonylethyl)phenyl)benzotriazole, 2-(3'-tert-butyl-5'-[2-(2-ethylhexyloxy)carbonylethyl]-2'-hydroxyphenyl)benzotriazole, 2-(3'-dodecyl-2'-hydroxy-5'-methylphenyl)benzotriazole, 2-(3'-tert-butyl-2'-hydroxy-5'-(2-isooctyloxycarbonylethyl)phenylbenzotriazole, 2,2'-methylene-bis[4-(1,1,3,3-tetramethylbutyl)-6-benzotriazole-2-ylphenol]; the transesterification product of 2-[3'-tert-butyl-5'-(2-methoxycarbonylethyl)-2'-hydroxyphenyl]-2H-benzotriazole with polyethylene glycol 300; [R—CH$_2$CH$_2$—COO—CH$_2$CH$_2$]$_2$ where R=3'-tert-butyl-4'-hydroxy-5'-2H-benzotriazol-2-ylphenyl, 2-[2'-hydroxy-3'-(α,α-dimethylbenzyl)-5'-(1,1,3,3-tetramethylbutyl)phenyl]benzotriazole; 2-[2'-hydroxy-3'-(1,1,3,3-tetramethylbutyl)-5'-(α,α-dimethylbenzyl)phenyl]benzotriazole.

2.2. 2-Hydroxybenzophenones, for example the 4-hydroxy, 4-methoxy, 4-octyloxy, 4-decyloxy, 4-dodecyloxy, 4-benzyloxy, 4,2',4'-trihydroxy and 2'-hydroxy-4,4'-dimethoxy derivatives.

2.3. Esters of substituted and unsubstituted benzoic acids, as for example 4-tertbutyl-phenyl salicylate, phenyl salicylate, octylphenyl salicylate, dibenzoyl resorcinol, bis (4-tert-butylbenzoyl)resorcinol, benzoyl resorcinol, 2,4-di-tert-butylphenyl 3,5-di-tert-butyl-4-hydroxybenzoate, hexadecyl 3,5-di-tert-butyl-4-hydroxybenzoate, octadecyl 3,5-di-tert-butyl-4hydroxybenzoate, 2-methyl-4,6-di-tert-butylphenyl 3,5-di-tert-butyl-4-hydroxybenzoate.

2.4. Acrylates, for example ethyl α-cyano-β,β-diphenylacrylate, isooctyl α-cyano-β,β-diphenylacrylate, methyl α-carbomethoxycinnamate, methyl α-cyano-β-methyl-p-methoxycinnamate, butyl α-cyano-β-methyl-p-methoxy-cinnamate, methyl α-carbomethoxy-p-methoxycinnamate and N-(β-carbomethoxy-β-cyanovinyl)-2-methylindoline.

2.5. Nickel compounds, for example nickel complexes of 2,2'-thio-bis-[4-(1,1,3,3-tetramethylbutyl)phenol], such as the 1:1 or 1:2 complex, with or without additional ligands such as n-butylamine, triethanolamine or N-cyclohexyldiethanolamine, nickel dibutyldithiocarbamate, nickel salts of the monoalkyl esters, e.g. the methyl or ethyl ester, of 4-hydroxy-3,5-di-tert-butylbenzylphosphonic acid, nickel complexes of ketoximes, e.g. of 2-hydroxy-4-methylphenyl undecylketoxime, nickel complexes of 1-phenyl-4-lauroyl-5-hydroxypyrazole, with or without additional ligands.

2.6. Oxamides, for example 4,4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N'-bis(3-dimethylaminopropyl)oxamide, 2-ethoxy-5-tert-butyl-2'-ethoxanilide and its mixture with 2-ethoxy-2'-ethyl-5,4'-di-tert-butoxanilide, mixtures of o- and p-methoxy-disubstituted oxanilides and mixtures of o- and p-ethoxy-disubstituted oxanilides.

2.7. 2-(2-Hydroxyphenyl)-1,3,5-triazines, for example 2,4,6-tris(2-hydroxy-4-octyloxyphenyl)-1,3,5-triazine, 2-(2-hydroxy-4-octyloxyphenyl)4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy4dodecyloxyphenyl)-4,6-bis(2,4-dimethylphenyl)-1,3,5-triazine, 2-(2-hydroxy4-tridecyloxyphenyl)-4,6-bis(2,4-dimethylphenyl)-1,3,5-triazine, 2-[2-hydroxy-4-(2-hydroxy-3-butyloxy-propoxy)phenyl]-4,6-bis(2,4-dimethyl)-1,3,5-triazine, 2-[2-hydroxy-4-(2-hydroxy-3-octyloxy-propyloxy)phenyl]-4,6-bis(2,4-dimethyl)-1,3,5-triazine, 2-[4-(dodecyloxy/tridecyloxy-2-hydroxypropoxy)-2-hydroxyphenyl]-4,6-bis(2,4-dimethylphenyl)-1,3,5-triazine, 2-[2-hydroxy-4-(2-hydroxy-3-dodecyloxypropoxy)phenyl]-4,6-bis(2,4-dimethylphenyl)-1,3,5-triazine, 2-(2-hydroxy-4-hexyloxy)phenyl-4,6-diphenyl-1,3,5-triazine, 2-(2-hydroxy-4-methoxyphenyl)-4,6-diphenyl-1,3,5-triazine, 2,4,6-tris[2-hydroxy-4-(3-butoxy-2-hydroxy-propoxy)phenyl]-1,3,5-triazine, 2-(2-hydroxyphenyl)-4-(4-methoxyphenyl)-6-phenyl-1,3,5-triazine, 2-{2-hydroxy-4-[3-(2-ethylhexyl-1-oxy)-2-hydroxypropyloxy]phenyl}-4,6-bis(2,4-dimethylphenyl)-1,3,5-triazine.

3. Metal deactivators, for example N,N'-diphenyloxamide, N-salicylal-N'-salicyloyl hydrazine, N,N'-bis(salicyloyl)hydrazine, N,N'-bis(3,5-di-tert-butyl-4-hydroxyphenylpropionyl)hydrazine, 3-salicyloylamino-1,2,4-triazole, bis(benzylidene)oxalyl dihydrazide, oxanilide, isophthaloyl dihydrazide, sebacoyl bisphenylhydrazide, N,N'-diacetyladipoyl dihydrazide, N,N'-bis(salicyloyl) oxalyl dihydrazide, N,N'-bis(salicyloyl)thiopropionyl dihydrazide.

4. Nitrones, for example, N-benzyl-alpha-phenyl-nitrone, N-ethyl-alpha-methyl-nitrone, N-octyl-alpha-heptyl-nitrone, N-lauryl-alpha-undecyl-nitrone, N-tetradecyl-alpha-tridcyl-nitrone, N-hexadecyl-alpha-pentadecyl-nitrone, N-octadecyl-alpha-heptadecyl-nitrone, N-hexadecyl-alpha-heptadecyl-nitrone, N-ocatadecyl-alpha-pentadecyl-nitrone, N-heptadecyl-alpha-heptadecyl-nitrone, N-octadecyl-alpha-hexadecyl-nitrone, nitrone derived from N,N-di(hydrogenated tallow)hydroxylamine.

5. Thiosynergists, for example, dilauryl thiodipropionate or distearyl thiodipropionate.

6. Peroxide scavengers, for example esters of β-thiodipropionic acid, for example the lauryl, stearyl, myristyl or tridecyl esters, mercaptobenzimidazole or the zinc salt of 2-mercaptobenzimidazole, zinc dibutyldithiocarbamate, dioctadecyl disulfide, pentaerythritol tetrakis(β-dodecylmercapto)propionate.

7. Basic co-stabilizers, for example, melamine, polyvinylpyrrolidone, dicyandiamide, triallyl cyanurate, urea derivatives, hydrazine derivatives, amines, polyamides, polyurethanes, alkali metal salts and alkaline earth metal salts of higher fatty acids for example calcium stearate, zinc stearate, magnesium behenate, magnesium stearate, sodium ricinoleate and potassium palmitate, antimony pyrocatecholate or zinc pyrocatecholate.

8. Nucleating agents, for example, inorganic substances such as talcum, metal oxides such as titanium dioxide or magnesium oxide, phosphates, carbonates or sulfates of, preferably, alkaline earth metals; organic compounds such as mono- or polycarboxylic acids and the salts thereof, e.g. 4-tert-butylbenzoic acid, adipic acid, diphenylacetic acid, sodium succinate or sodium benzoate; polymeric compounds such as ionic copolymers (ionomers).

9. Fillers and reinforcing agents, for example, calcium carbonate, silicates, glass fibres, glass bulbs, asbestos, talc, kaolin, mica, barium sulfate, metal oxides and hydroxides, carbon black, graphite, wood flour and flours or fibers of other natural products, synthetic fibers.

10. Benzofuranones and indolinones, for example those disclosed in U.S. Pat. Nos. 4,325,863; 4,338,244; 5,175,312; 5,216,052; 5,252,643; 5,369,159; 5,488,117; 5,356,966; 5,367,008; 5,428,162; 5,428,177; 5,516,920; DE-A-4316611; DE-A-4316622; DE-A-4316876; EP-A-0589839 or EP-A-0591102 or 3-[4-(2-acetoxyethoxy)phenyl]-5,7-di-tert-butyl-benzofuran-2-one, 5,7-di-tert-butyl-3-[4-(2-stearoyloxyethoxy)phenyl]benzofuran-2-one, 3,3'-bis[5,7-di-tert-butyl-3-(4-[2-hydroxyethoxy]phenyl)benzofuran-2-one], 5,7-di-tert-butyl-3-(4-ethoxyphenyl)benzofuran-2-one, 3-(4-acetoxy-3,5-dimethylphenyl)-5,7-di-tert-butyl-benzofuran-2-one, 3-(3,5-dimethyl-4-pivaloyloxyphenyl)-5,7-di-tert-butyl-benzofuran-2-one, 3-(3,4-dimethylphenyl)-5,7-di-tert-butyl-benzofuran-2-one, 3-(2,3-dimethylphenyl)-5,7-di-tert-butyl-benzofuran-2-one.

11. Other additives, for example, plasticisers, lubricants, emulsifiers, pigments, rheology additives, catalysts, flow-control agents, optical brighteners, flameproofing agents, antistatic agents, clarifying agents and blowing agents.

The costabilizers are added, for example, in concentrations of from about 0.01% to about 10% by weight, based on the overall weight of the polyolefin to be stabilized.

The fillers and reinforcing agents (item 9 in the list), for example talc, calcium carbonate, mica or kaolin, are added to the polyolefins in concentrations of about 0.01% to about 40% by weight, based on the overall weight of the polyolefins to be stabilized.

The fillers and reinforcing agents (item 9 in the list), for example metal hydroxides, especially aluminium hydroxide or magnesium hydroxide, are added to the polyolefins in concentrations of about 0.01% to about 60% by weight, based on the overall weight of the polyolefins to be stabilized.

Carbon black as filler is added to the polyolefins in concentrations, judiciously, of from about 0.01% to about 5% by weight, based on the overall weight of the polyolefins to be stabilized.

Glass fibers as reinforcing agents are added to the polyolefins in concentrations, judiciously, of from about 0.01% to about 20% by weight, based on the overall weight of the polyolefins to be stabilized.

Preferred is a process comprising in addition to components (a), (b) and (c) further additives as well, especially phenolic antioxidants, light stabilizers or processing stabilizers.

Especially preferred additional additives are phenolic antioxidants (items 1.1 to 1.17 in the list) and peroxide scavengers (item 6 in the list).

The incorporation of components (a), (b) and (c) and optional further additives into the polyolefin is carried out by known methods, for example before or after molding or also by applying the dissolved or dispersed stabilizer mixture to the polyolefin, with or without subsequent evaporation of the solvent. The stabilizer mixture of components (a), (b) and (c) and optional further additives can also be added to the polyolefins to be stabilized in the form of a masterbatch which contains these components in a concentration of, for example, about 2.5% to about 25% by weight.

Components (a), (b) and (c) and optional further additives can also be added before or during the polymerization or before crosslinking.

Components (a), (b) and (c) and optional further additives can be incorporated into the polyolefin to be stabilized in pure form or encapsulated in waxes, oils or polymers.

Components (a), (b) and (c) and optional further additives can also be sprayed onto the polyolefin to be stabilized. They are able to dilute other additives (for example the conventional additives indicated above) or their melts so that they can be sprayed also together with these additives onto the polyolefin to be stabilized. Addition by spraying during the deactivation of the polymerization catalysts is particularly advantageous, it being possible to carry out spraying using, for example, the steam used for deactivation.

In the case of spherically polymerized polyolefins it may, for example, be advantageous to apply components (a), (b) and (c), optionally together with other additives, by spraying.

During the rotomolding process, the temperature expediently reaches the range from about 200° C. to 400° C., preferably from about 280° C. to 400° C., for example from about 310° C. to 400° C.

A preferred embodiment of this invention relates to the use of the stabilizer combination comprising components (a), (b) and (c) for polyolefins processed by the rotomolding process.

The following Examples illustrate the invention in more detail. They are not to be construed as limiting the instant invention in any manner whatsoever. The invention is declared to cover all changes and modifications of the specific examples which do not constitute departure from the spirit and scope of the invention. Parts and percentages are by weight.

EXAMPLE 1

Preparation of Polyolefin Hollow Articles by the Rotomolding Process 100 parts medium density, polyethylene, copolymerized with hexene (Novapol® TR-0735, nominal melt index 6.8 g/10 min., density 0.935 g/cm$^3$) are dry blended with 0.050 parts of calcium stearate and a combination of additional stabilizers (see below). The mixtures are melt compounded into pellets at 232° C. in a Superior/MPM extruder using a 24:1 L/D screw with Maddock mixing head at 100 rpm.

The compounded pellets are ground to a uniform particle size (150–500 µm) prior to the rotational molding process. This grinding step increases the surface area of the particles leading to a faster heat absorption, and thus reducing overall energy consumption.

The rotational molding process is performed in a laboratory scale equipment FSP M20 "Clamshell". The ground resin is placed in a cast aluminum mold, which is rotated biaxially in a gas fired oven. Hot air is circulated by blowers in the chamber while the temperature is increased to 288° C. within 4 minutes. This temperature is maintained for a specific time (see Tables below). Subsequently, the oven is opened and while still rotating, the mold is cooled with forced air circulation for 7 minutes, followed by water spray mist for 7 minutes, and an additional air cooling step for 2 minutes. Throughout the entire heating and cooling cycles, the speed of the major axis is maintained at 6 rpm with a 4.5:1 ratio of rotation. After the cooling cycles, the mold is opened and the hollow object removed.

Formulation A is additionally blended with a combination of 0.100 parts of the phosphite process stabilizer Irgafos® 168, 0.050 parts of the primary antioxidant Irganox® 1076 and 0.200 parts of the light and heat stabilizer Tinuvin® 783.

Formulation B is additionally blended with a combination of 0.100 parts of the phosphite process stabilizer Irgafos® 168, 0.050 parts of the hydroxylamine process stabilizer Irgastab® 042 and 0.200 parts of the light and heat stabilizer Tinuvin® 783.

Formulation C is additionally blended with a combination of 0.100 parts of the phosphonite process stabilizer Irgafos® P-EPQ, 0.050 parts of the hydroxylamine process stabilizer Irgastab® 042 and 0.200 parts of the light and heat stabilizer Tinuvin® 783.

Formulation D is additionally blended with a combination of 0.100 parts of the phosphite process stabilizer Ultranox® 626, 0.050 parts of the hydroxylamine process stabilizer Irgastab® 042 and 0.200 parts of the light and heat stabilizer Tinuvin® 783.

Irgafos® 168 tris-(2,4-di-tert-butylphenyl)phosphite. Ultranox® 626 is bis(2,4-di-tert-butylphenyl)pentaerythritol diphosphite. Irgafos® P-EPQ is tetrakis(2,4-di-tert-butylphenyl)4,4'-biphenylene-diphosphonite. Irgastab® 042 is the N,N-di(alkyl)hydroxylamine produced by the direct oxidation of N,N-di(hydrogenated tallow)amine. Tinuvin® 783 is a combination of hindered amines of formulae (H4) and (H5). Irganox® 1076 is octadecyl 3-(3,5-di-tert-butyl-4-hydroxyphenyl)propionate. Tinuvin®, Irgafos®, Irgastab® and Irganox® are registered trademarks of Ciba Specialty Chemicals Corporation. Ultranox® is a registered trademark of GE Chemicals.

Formulations A–D are rotationally molded into hollow objects according to the general procedure with hold times of 6 to 14 minutes.

Yellowness Index of the outer surface is determined on a DCI SF600 spectrophotometer according to ASTM D 1925. An increase in yellowness corresponds to a positive increase in the Yellowness Index. Formulations B–D are far superior to the comparative standard Formulation A with regard to color stability at these processing conditions. The results are reported in Table 1.

TABLE 1

| Time Held at 288° C. (min.) | Yellowness Index Formulation | | | |
|---|---|---|---|---|
| | A | B | C | D |
| 6 | −2.13 | −3.80 | −3.49 | −3.00 |
| 8 | −1.72 | −4.08 | −3.86 | −3.30 |
| 10 | −0.10 | −1.86 | −2.63 | −2.70 |
| 12 | 9.58 | 0.96 | −0.15 | −0.46 |
| 14 | 8.00 | 3.14 | 5.28 | 1.40 |

Low-temperature impact strength testing is performed with an instrumented drop weight (11.34 kg/50.8 cm) impact apparatus Dynatup® 8250. Test specimens are conditioned in an air circulated freezer for no less than 12 hours at −40° C. prior to test.

The impact strength results, reported in % brittleness, are found in Table 2. Formulation B proves to be superior to the comparative standard Formulation A with regard to the failure mode based on low-temperature impact strength testing at these processing conditions.

TABLE 2

| | Impact Strength (% brittleness) | |
|---|---|---|
| Time Held at 288° C. (min.) | Formulation A | Formulation B |
| 6 | 0 | 0 |
| 8 | 20 | 0 |
| 10 | 20 | 0 |
| 12 | 100 | 100 |

The stabilizer mixtures of the present invention (Formulations B–D) are superior compared to a state-of-the-art stabilizer mixture (Formulation A) for the prevention of color formation and for providing stability of polyolefin hollow articles produced by the rotomolding process.

EXAMPLE 2

Preparation of Polyolefin Hollow Articles by the Rotomolding Process

Hollow articles are prepared as per Example 1, replacing Tinuvin® 783 of Formulation B with each of the following hindered amine stabilizers:

Formulation E: Irgafos® 168, Irgastab® 042 and Tinuvin® 622 (compound of formula (H4)).

Formulation F: Irgafos® 168, Irgastab® 042 and Chimassorb® 944 (compound of formula (H5)).

Formulation G: Irgafos® 168, Irgastab® 042 and Chimassorb® 119 (compound of formula (H9)).

Formulation H: Irgafos®168, Irgastab® 042 and Tinuvin®111 (a mixture of compounds of formulae (H4) and (H9)).

Formulation I: Irgafos® 168, Irgastab® 042 and Chimassorb® 2020 (compound of formula (H10)).

Formulation J: Irgafos® 168, Irgastab® 042 and Cyasorb® UV-3346 (compound of formula (H12)).

Formulation K: Irgafos® 168, Irgastab® 042 and Cyasorb® UV-3529 (compound of formula (H13)).

Formulation L: Irgafos® 168, Irgastob® 042 and Uvasorb® HA88 (compound of formula (H17)).

Formulation M: Irgafos® 168, Irgastab® 042 and Tinuvin® 123 (compound of formula (H1)).

Formulation N: Irgafos® 168, Irgastab® 042 and hindered amine compound of formula (H11).

Formulation O: Irgafos® 168, Irgastab® 042 and Hostavin® N30 (compound of formula (H14)).

Formulation P: Irgafos® 168, Irgastab® 042 and Uvinul® 5050H (compound of formula (H15)).

Formulation Q: Irgafos® 168, Irgastab® 042 and Uvasil® 299 (compound of formula (H16)).

Formulation R: Irgafos® 168, Irgastab® 042 and Uvasorb® HA88 (compound of formula (H17)).

Irgafos® 168 is tris(2,4-di-tert-butylphenyl)phosphite. Irgastab® 042 is a di(alkyl)hydroxylamine produced by the direct oxidation of N,N-di(hydrogenated tallow)amine. Irgafos®, Irgastab®, Tinuvin® and Chimassorb® are protected trade names of Ciba Specialty Chemicals Corporation. Cyasorb® is a protected trade name of Cytec Corporation. Hostavin® is a protected trade name of Clariant. Uvinul® is a protected trade name of BASF. Uvasil® is a protected trade name of Enichem. Uvasorb® is a protected trade name of 3V Sigma.

The stabilizer mixtures of the present invention (Formulations E–R) are superior compared to a state-of-the-art stabilizer mixture (Formulation A) for the prevention of color formation and for providing stability of polyolefin hollow articles produced by the rotomolding process.

EXAMPLE 3

Preparation of Polyolefin Hollow Articles by the Rotomolding Process

Hollow articles are prepared as per Example 1, replacing Irgastob® 042 with N,N-dibenzylhydroxylamine in Formulations B–D. The stabilizer mixtures of the instant invention, comprising an organic phosphite or phosphonite, N,N-dibenzylhydroxylamine and Tinuvin® 783 are superior compared to a state-of-the-art stabilizer mixture (Formulation A) for the prevention of color formation and for providing stability of polyolefin hollow articles produced by the rotomolding process.

EXAMPLE 4

Preparation of Polyolefin Hollow Articles by the Rotomolding Process

Hollow articles are prepared as per Example 1, replacing Irgafos® 168 of Formulation B with the phosphite process stabilizer Irgafos® 38.

Irgafos® 38, available from Ciba Specialty Chemicals Corporation, is bis(2,4-di-tert-butyl-6-methylphenyl)ethyl phosphite.

The formulation of the present invention comprising Irgafos® 38 is superior compared to a state-of-the-art stabilizer mixture (Formulation A) for the prevention of color formation and for providing stability of polyolefin hollow articles produced by the rotomolding process.

EXAMPLE 5

Preparation of Polyolefin Hollow Articles by the Rotomolding Process

Hollow articles are prepared as per Example 1, replacing Irgastab® 042 of Formulations B–D with the amine oxide Genox™ EP. The stabilizer mixtures of the present invention, comprising an organic phosphite or phosphonite, Genoxm™ EP and Tinuvin® 783 are superior compared to a state-of-the-art stabilizer mixture (Formulation A) for the prevention of color formation and for providing stability of polyolefin hollow articles produced by the rotomolding process.

Genox™ EP is a di($C_{16}$–$C_{18}$)alkyl methyl amine oxide, CAS# 204933-93-7, available from GE Specialty Chemicals.

EXAMPLE 6

Preparation of Polyolefin Hollow Articles by the Rotomolding Process

Hollow articles are prepared as per Example 1, replacing Irgafos® 168 and Irgastab® 042 of Formulation B with the phosphite process stabilizer Irgafos® 38 and the amine oxide Genox™ EP, respectively.

Irgafos® 38, available from Ciba Specialty Chemicals Corporation, is bis(2,4-di-tert-butyl-6-methylphenyl)ethyl phosphite. Genox™ EP is a di($C_{16}$–$C_{18}$)alkyl methyl amine oxide, CAS# 204933-93-7, available from GE Specialty Chemicals.

The formulation of the present invention comprising Irgafos® 38, Genox™ EP and Tinuvin® 783 is superior compared to a state-of-the-art stabilizer mixture (Formulation A) for the prevention of color formation and for providing stability of polyolefin hollow articles produced by the rotomolding process.

What is claimed is:

1. A process for the production of polyolefin hollow articles, which comprises
   charging the polyolefin with a stabilizer combination, comprising
   (a) at least one compound from the group of the organic phosphites and phosphonites,
   (b) one or more compounds selected from the group consisting of hydroxylamine derivatives and
   (c) at least one compound from the group of the hindered amine stabilizers, filling this mixture into a mold, heating this mold in an oven to above 280° C., such that the stabilized polyolefin fuses, rotating the mold around at least 2 axes, the plastic material spreading to the walls, cooling the mold while still rotating, opening it, and taking the resultant hollow article out.

2. A process according to claim 1 wherein the organic phosphites and phosphonites of component (a) are selected from the group consisting of formulae (1), (2), (3), (4), (5), (6) and (7)

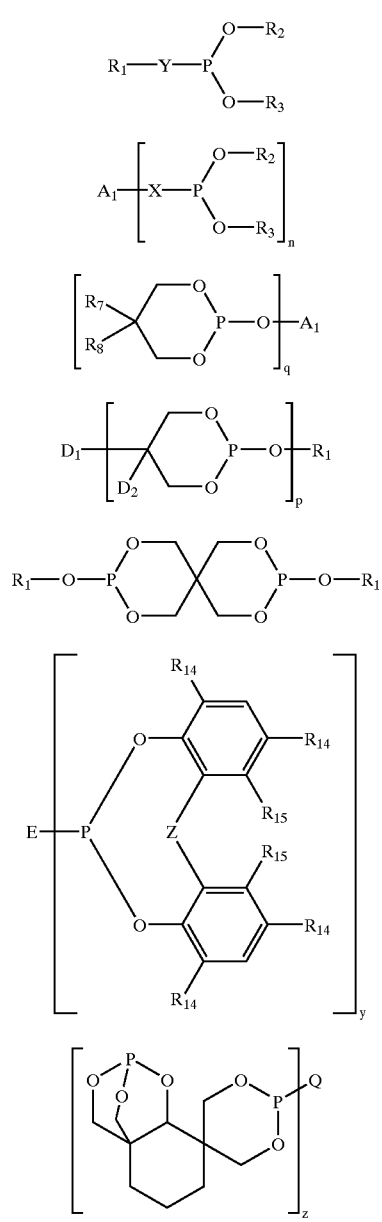

in which the indices are integral and n is 2, 3 or 4; p is 1 or 2; q is 2 or 3; r is 4 to 12; y is 1, 2 or 3; and z is 1 to 6;

$A_1$, if n is 2, is $C_2$–$C_{18}$ alkylene; $C_2$–$C_{12}$ alkylene interrupted by oxygen, sulfur or —$NR_4$—; a radical of the formula

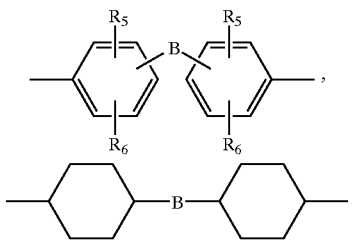

or phenylene;

$A_1$, if n is 3, is a radical of the formula —$C_rH_{2r-1}$—;

$A_1$, if n is 4, is

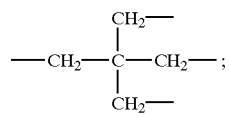

$A_2$ is as defined for $A_1$ if n is 2;

B is a direct bond, —$CH_2$—, —$CHR_4$—, —$CR_1R_4$—, sulfur, $C_5$–$C_7$ cycloalkylidene, or cyclohexylidene which is substituted by from 1 to 4 $C_1$–$C_4$ alkyl radicals in position 3, 4 and/or 5;

$D_1$, if p is 1, is $C_1$–$C_4$ alkyl and, if p is 2, is —$CH_2OCH_2$—;

$D_2$, if p is 1, is $C_1$–$C_4$ alkyl;

E, if y is 1, is $C_1$–$C_{18}$ alkyl, —$OR_1$ or halogen;

E, if y is 2, is —O—$A_2$—O—,

E, if y is 3, is a radical of the formula $R_4C(CH_2O-)_3$ or $N(CH_2CH_2O-)_3$;

Q is the radical of an at least z-valent alcohol or phenol, this radical being attached via the oxygen atom to the phosphorus atom;

$R_1$, $R_2$ and $R_3$ independently of one another are $C_1$–$C_{18}$ alkyl which is unsubstituted or substituted by halogen, —$COOR_4$, —CN or —$CONR_4R_4$; $C_2$–$C_{18}$ alkyl interrupted by oxygen, sulfur or —$NR_4$—; $C_7$–$C_9$ phenylalkyl; $C_5$–$C_{12}$ cycloalkyl, phenyl or naphthyl; naphthyl or phenyl substituted by halogen, 1 to 3 alkyl radicals or alkoxy radicals having a total of 1 to 18 carbon atoms or by $C_7$–$C_9$ phenylalkyl; or a radical of the formula

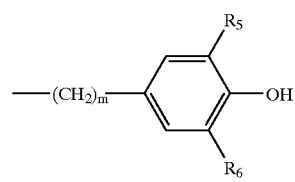

in which m is an integer from the range 3 to 6;

$R_4$ is hydrogen, $C_1$–$C_{18}$ alkyl, $C_5$–$C_{12}$ cycloalkyl or $C_7$–$C_9$ phenylalkyl, $R_5$ and $R_6$ independently of one another are hydrogen, $C_1$–$C_8$ alkyl or $C_5$–$C_6$ cycloalkyl, R₇ and R₈, if q is 2, independently of one another are C₁–C₄ alkyl or together are a 2,3-dehydropentamethylene radical; and R₇ and R₈, if q is 3, are methyl;

R₁₄ is hydrogen, C₁–C₉ alkyl or cyclohexyl,

R₁₅ is hydrogen or methyl and, if two or more radicals R₁₄ and R₁₅ are present, these radicals are identical or different, X and Y are each a direct bond or oxygen, Z is a direct bond, methylene, —C(R₁₆)₂— or sulfur, and R₁₆ is C₁–C₈ alkyl.

3. A process according to claim 1 wherein the organic phosphites and phosphonites of component (a) are selected from the group consisting of tris(2,4-di-tert-butylphenyl) phosphite, tris(nonylphenyl)phosphite and formulae (A), (B), (C), (D), (E), (F), (G), (H), (J), (K) and (L)

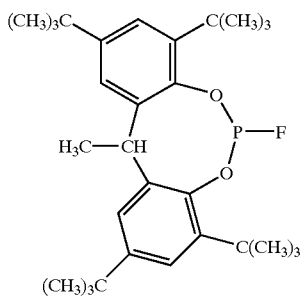
(A)

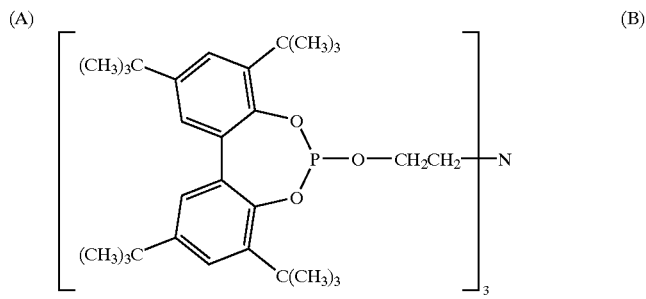
(B)

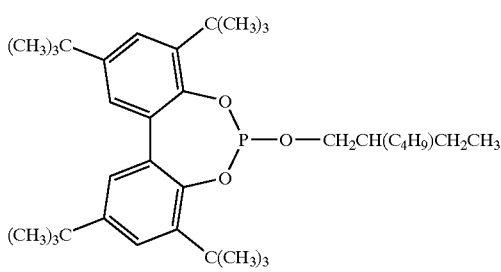
(C)

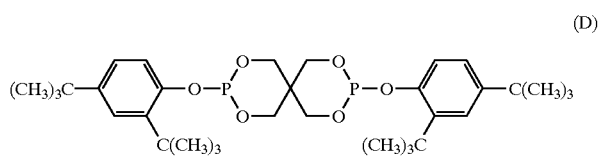
(D)

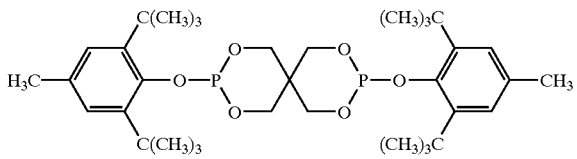
(E)

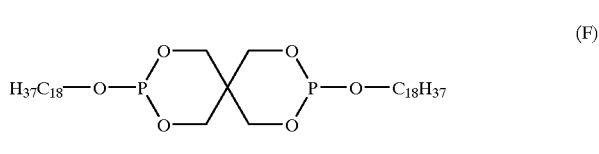
(F)

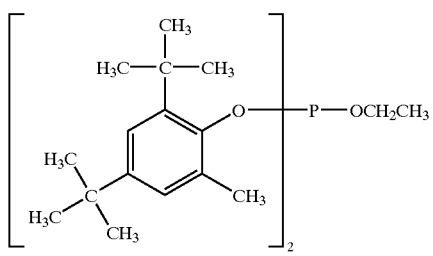
(G)

(H)

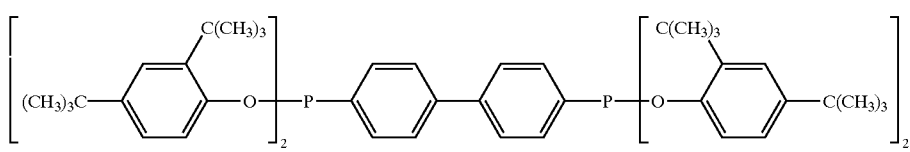

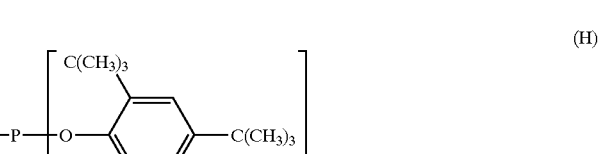
(J)

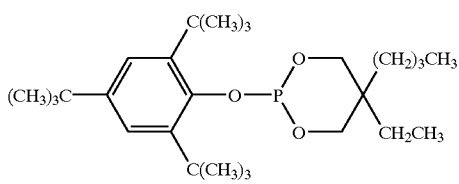

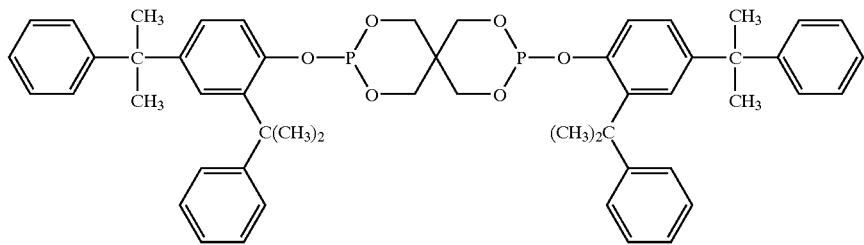
(K)

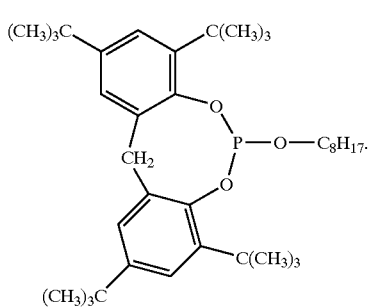
(L)

4. A process according to claim 1 wherein the hydroxylamine derivatives are of the formula (II)

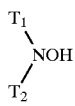
(II)

wherein

T$_1$ is straight or branched chain alkyl of 1 to 36 carbon atoms, cycloalkyl of 5 to 12 carbon atoms, aralkyl of 7 to 9 carbon atoms, or said aralkyl substituted by one or two alkyl of 1 to 12 carbon atoms or by one or two halogen atoms;

T$_2$ is hydrogen, or independently has the same meaning as T$_1$.

5. A process according to claim 4 wherein T$_1$ and T$_2$ are independently benzyl, ethyl, octyl, lauryl, dodecyl, tetradecyl, hexadecyl, heptadecyl or octadecyl.

6. A process according to claim 1 wherein the hydroxylamine derivatives are selected from the group consisting of N,N-dibenzylhydroxylamine, N,N-diethylhydroxylamine, N,N-dioctylhydroxylamine, N,N-dilaurylhydroxylamine, N,N-didodecylhydroxylamine, N,N-ditetradecylhydroxylamine, N,N-dihexadecylhydroxylamine, N,N-dioctadecylhydroxylamine, N-hexadecyl-N-tetradecylhydroxylamine, N-hexadecyl-N-heptadecylhydroxylamine, N-hexadecyl-N-octadecylhydroxylamine, N-heptadecyl-N-octadecylhydroxylamine, and N,N-di(hydrogenated tallow)hydroxylamine.

7. A process according to claim 1 wherein component (b) is an N,N-di(alkyl)hydroxylamine produced by the direct oxidation of N,N-di(hydrogenated tallow)amine.

8. A process according to claim 1 wherein the hindered amine stabilizers of component (c) contain at least one group of the formula (VI)

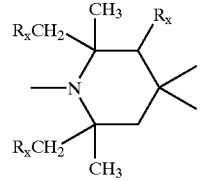
(VI)

in which R$_x$ is hydrogen or methyl.

9. A process according to claim 8 wherein the hindered amine stabilizers are selected from the group consisting of formulae (H1), (H2), (H3), (H4), (H5), (H6), (H7), (H8), (H9), (H10), (H11), (H12), (H13), (H14), (H15), (H16) and (H17)

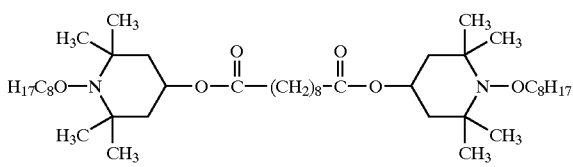
(H1)

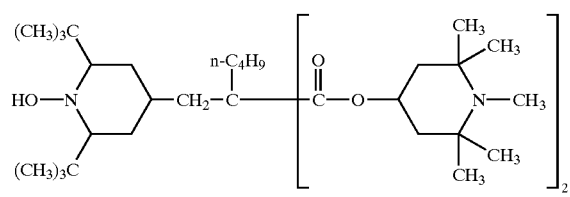
(H2)

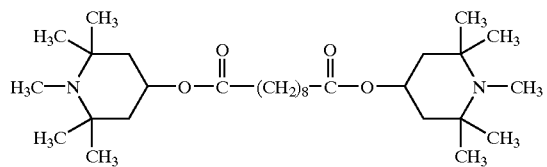
(H3)
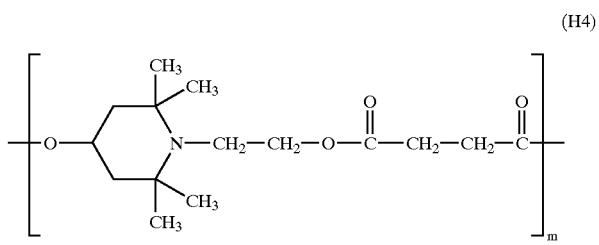
(H4)
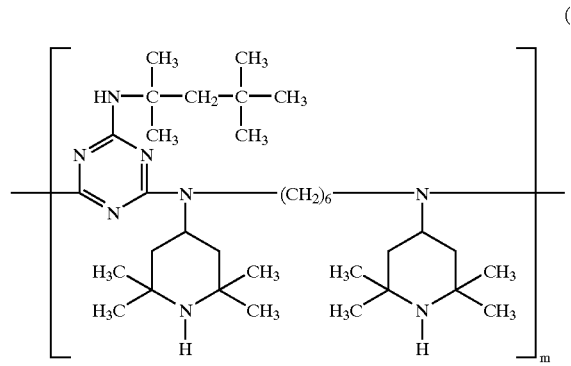
(H5)
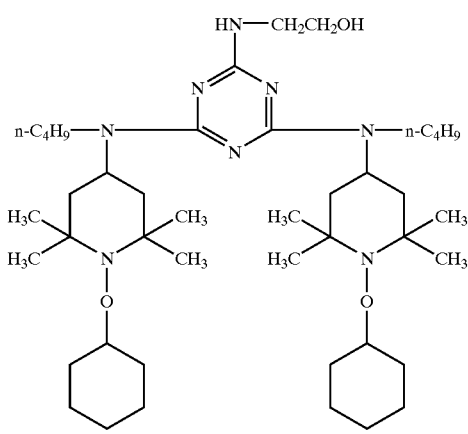
(H6)
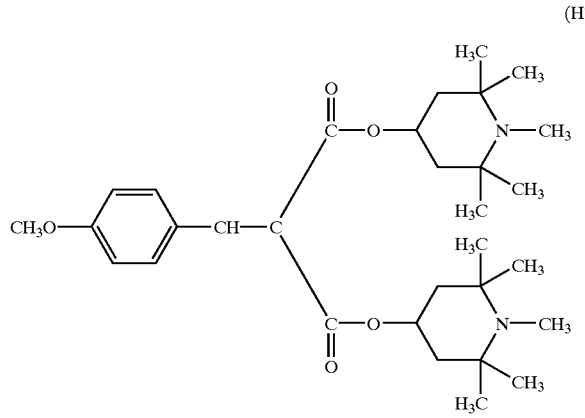
(H7)
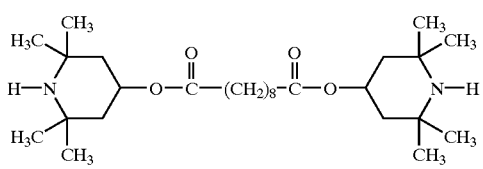
(H8)
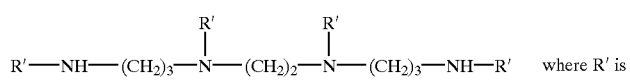 where R' is 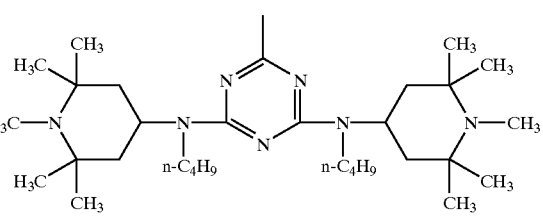
(H9)

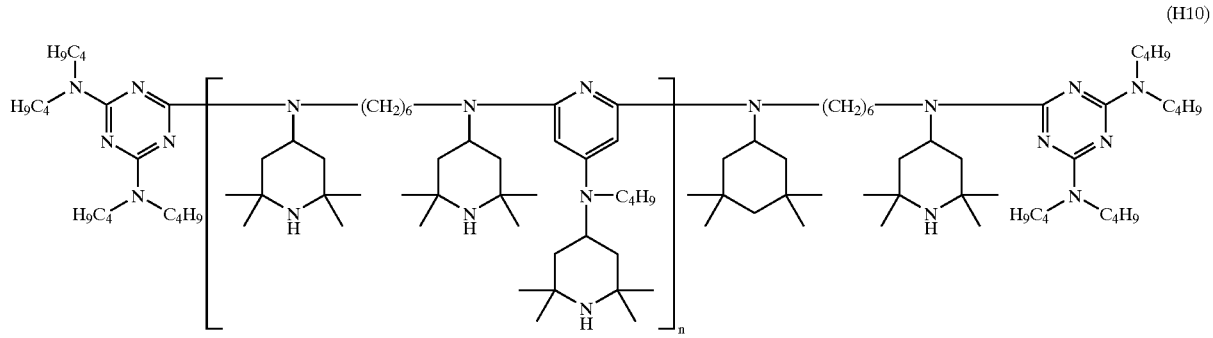
(H10)
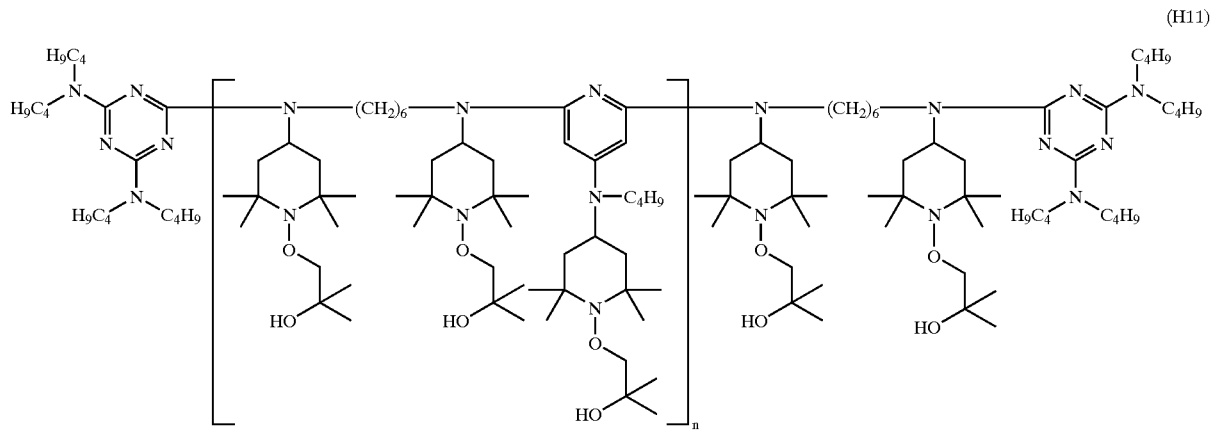
(H11)
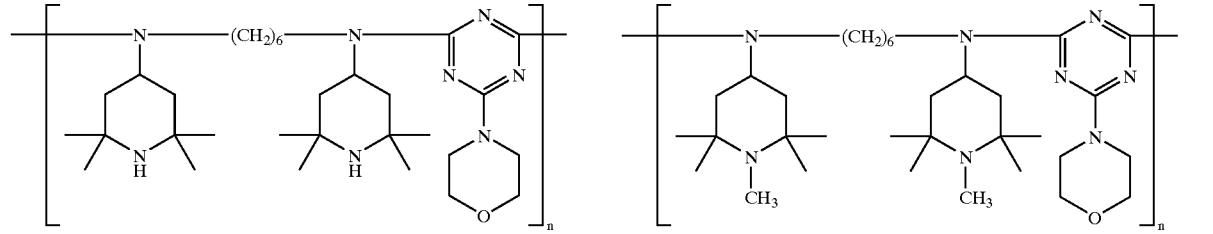
(H12) (H13)
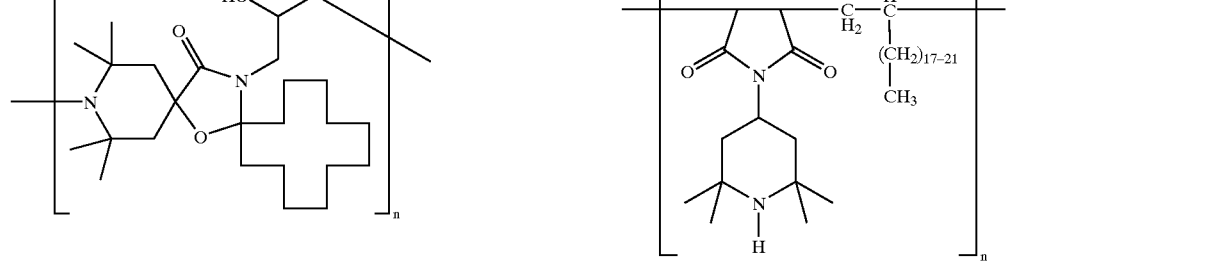
(H14) (H15)
(H16)
and

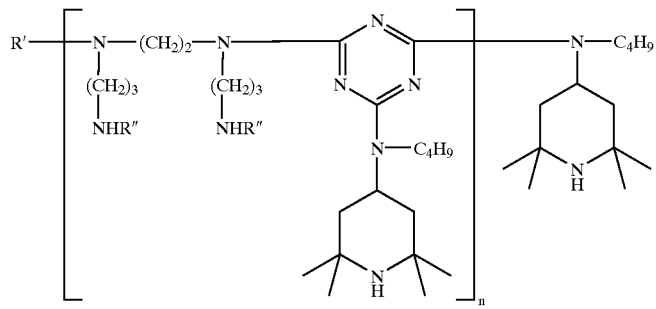
and where R″ =
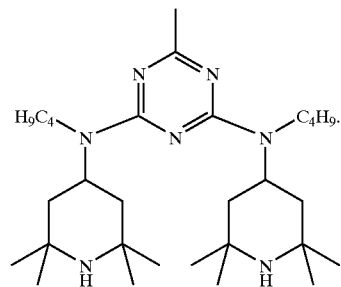
(H17)
10. A process according to claim 1, wherein the temperature reaches the range from above 280° C. to 400° C.
* * * * *